United States Patent
Doherty et al.

(10) Patent No.: US 11,125,664 B2
(45) Date of Patent: Sep. 21, 2021

(54) ANALYTICAL INSTRUMENTS, METHODS, AND COMPONENTS

(71) Applicant: Montana Instruments Corporation, Bozeman, MT (US)

(72) Inventors: Josh Doherty, Bozeman, MT (US);
William Baker, Bozeman, MT (US);
Joseph Evers, Bozeman, MT (US);
Ben Linkenhoker, Bozeman, MT (US);
Luke Mauritsen, Belgrade, MT (US);
Jamesen Motley, Bozeman, MT (US);
Ryan Murdick, Bozeman, MT (US);
Anjan Reijnders, Bozeman, MT (US)

(73) Assignee: Montana Instruments Corporation, Bozeman, MT (US)

( * ) Notice: Subject to any disclaimer, the term of this patent is extended or adjusted under 35 U.S.C. 154(b) by 160 days.

(21) Appl. No.: 16/209,220

(22) Filed: Dec. 4, 2018

(65) Prior Publication Data
US 2019/0170623 A1    Jun. 6, 2019

Related U.S. Application Data

(60) Provisional application No. 62/594,427, filed on Dec. 4, 2017.

(51) Int. Cl.
| | |
|---|---|
| G01N 1/42 | (2006.01) |
| F17C 3/08 | (2006.01) |
| F25D 19/00 | (2006.01) |
| G01N 35/00 | (2006.01) |
| G01N 1/44 | (2006.01) |

(52) U.S. Cl.
CPC ............... *G01N 1/42* (2013.01); *F17C 3/085* (2013.01); *F25D 19/00* (2013.01); *F25D 19/006* (2013.01); *G01N 1/44* (2013.01); *G01N 35/00* (2013.01); *F17C 2223/0161* (2013.01); *G01N 2035/00445* (2013.01)

(58) Field of Classification Search
CPC .. F17C 2223/0161; F17C 3/085; F25D 19/00; F25D 19/006; G01N 1/42; G01N 1/44; G01N 2035/00445; G01N 35/00
See application file for complete search history.

(56) References Cited

U.S. PATENT DOCUMENTS

| | | |
|---|---|---|
| 3,415,077 A | 12/1968 | Collins |
| 3,613,387 A | 10/1971 | Collins |
| 4,242,885 A | 1/1981 | Quack et al. |

(Continued)

OTHER PUBLICATIONS http://coldedgetech.com/stinger ColdEdge Technologies, Jun. 11, 2017; United States, 6 pages.

(Continued)

*Primary Examiner* — Francis C Gray
(74) *Attorney, Agent, or Firm* — Wells St. John P.S.

(57) ABSTRACT

Variable temperature analytical instruments are provided that can include: at least one heat or cold source configured to generate a temperature; and discrete instrument portions individually thermally coupled to the at least one source. Methods for maintaining temperatures within variable temperature analytical instruments are also provided. The methods can include providing a plurality of thermal coupling between a plurality of discrete heat or cold sources to a plurality of discrete portions of the instrument.

23 Claims, 26 Drawing Sheets

(56) References Cited

U.S. PATENT DOCUMENTS

| | | | |
|---|---|---|---|
| 4,543,794 A | 10/1985 | Matsutani et al. | |
| 4,713,942 A | 12/1987 | Hofmann | |
| 4,745,760 A | 5/1988 | Porter | |
| 4,790,147 A | 12/1988 | Kuriyama et al. | |
| 4,848,093 A | 7/1989 | Simmonds et al. | |
| 5,485,731 A | 1/1996 | Venetucci et al. | |
| 5,552,608 A | 9/1996 | Gallagher et al. | |
| 5,584,184 A | 12/1996 | Inaguchi et al. | |
| 5,647,228 A | 7/1997 | Sager et al. | |
| 5,665,314 A * | 9/1997 | Berger | G01N 30/30 422/83 |
| 5,936,499 A | 8/1999 | Eckels | |
| 5,979,176 A | 11/1999 | Stables et al. | |
| 6,196,005 B1 | 3/2001 | Stautner | |
| 6,263,677 B1 | 7/2001 | Hafner et al. | |
| 6,280,688 B1 | 8/2001 | Motz | |
| 6,427,778 B1 | 8/2002 | Beall et al. | |
| 8,671,698 B2 | 3/2014 | Wang | |
| 8,746,008 B1 | 6/2014 | Mauritsen et al. | |
| 9,618,287 B2 | 4/2017 | Black et al. | |
| 2001/0023592 A1 | 9/2001 | Odawara et al. | |
| 2003/0177814 A1* | 9/2003 | Weckstrom | G01N 21/3504 73/25.01 |
| 2004/0187519 A1 | 9/2004 | Zhu et al. | |
| 2005/0067159 A1 | 3/2005 | Hall et al. | |
| 2005/0229609 A1 | 10/2005 | Kirichek et al. | |
| 2009/0094992 A1 | 4/2009 | Wang | |
| 2009/0195980 A1* | 8/2009 | Shih | F25B 21/02 361/688 |
| 2009/0199579 A1 | 8/2009 | Kundig | |
| 2010/0050661 A1 | 3/2010 | Snow et al. | |
| 2012/0096873 A1* | 4/2012 | Webber | F25D 19/006 62/48.1 |
| 2013/0021032 A1 | 1/2013 | Heiss et al. | |
| 2013/0179090 A1* | 7/2013 | Conroy | G01N 33/2882 702/25 |
| 2014/0202174 A1 | 7/2014 | Wang | |
| 2014/0245757 A1 | 9/2014 | Garside et al. | |
| 2015/0300719 A1* | 10/2015 | Strickland | F28D 7/106 62/62 |
| 2015/0355091 A1* | 12/2015 | Conroy | G01N 33/2882 250/459.1 |
| 2016/0123537 A1 | 5/2016 | Heiss et al. | |
| 2017/0168121 A1 | 6/2017 | Yu et al. | |
| 2017/0323764 A1 | 11/2017 | Muto et al. | |

OTHER PUBLICATIONS

RC102-CFM Microscopy Cryostat System Brochure, Cryo Industries of America, Inc., Sep. 3, 2013; United States, 14 pages.

Wang et al., "A Compact Cold Helium Circulation System with GM Cryocooler", 2014, United States, 6 pages.

* cited by examiner

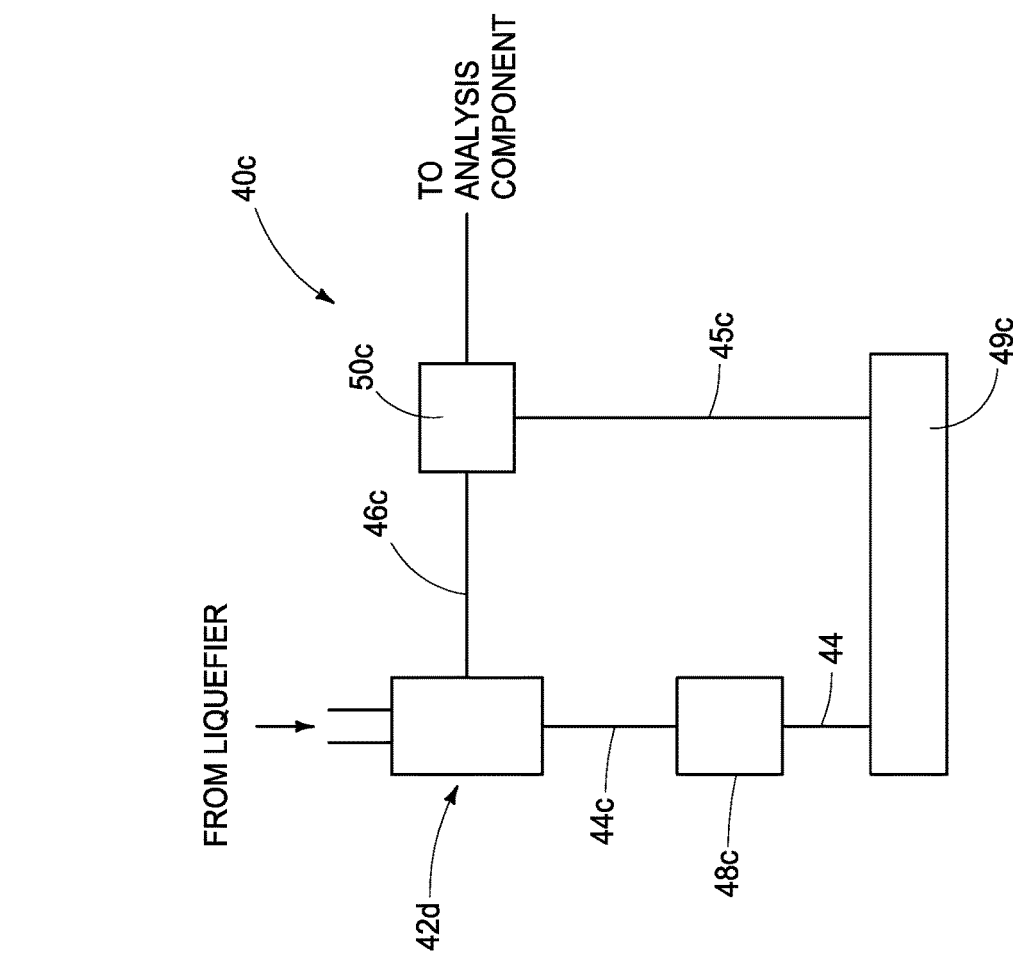
FIG. 4C
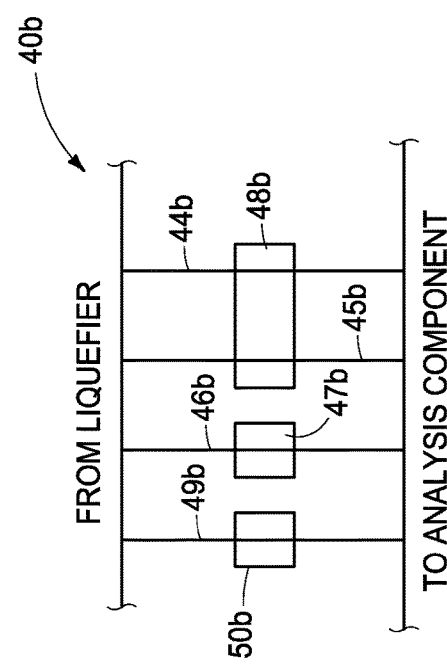
FIG. 4A
FIG. 4B

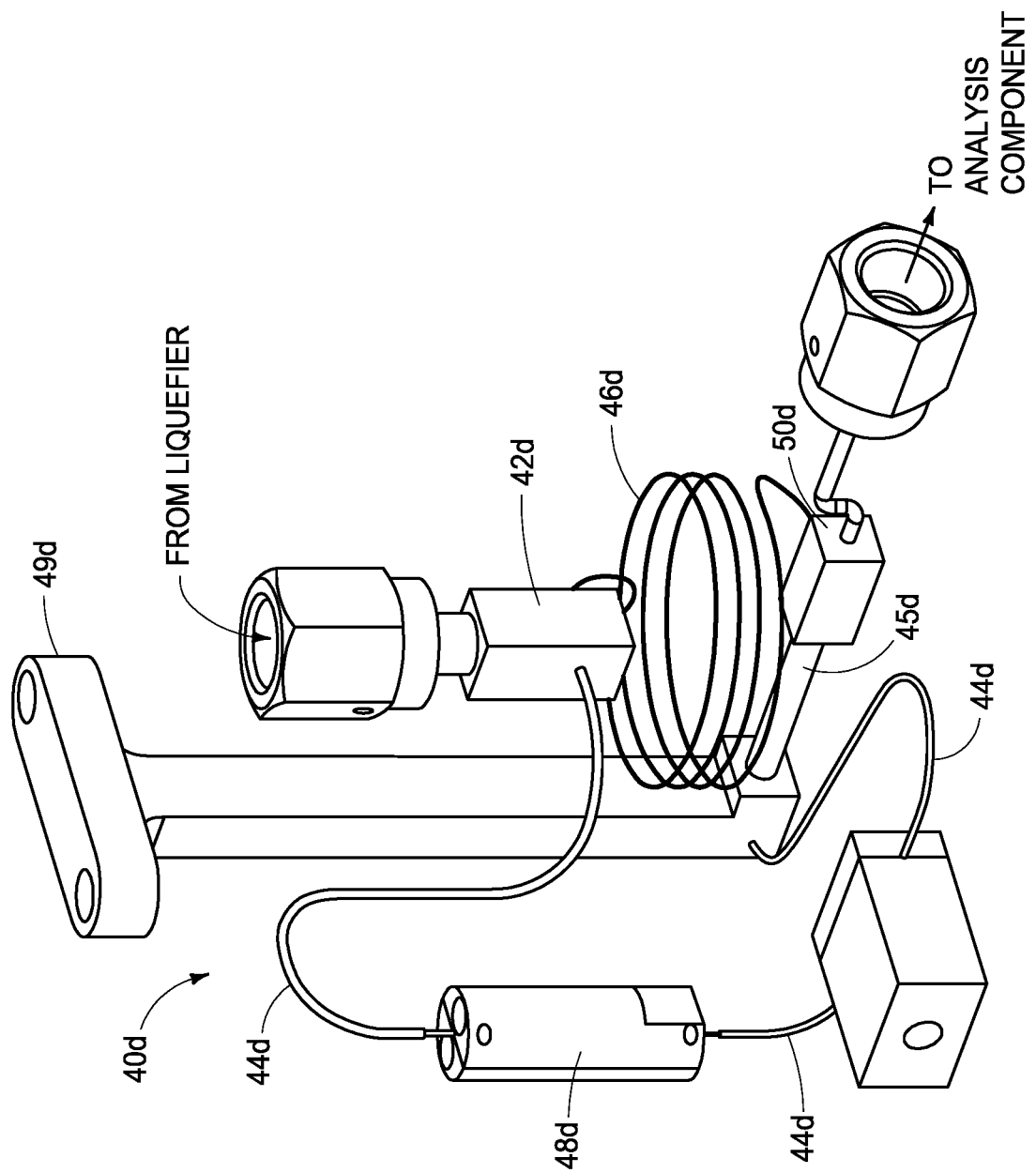

ANALYTICAL INSTRUMENTS, METHODS, AND COMPONENTS

CROSS REFERENCE TO RELATED APPLICATION

This application claims priority to and the benefit of U.S. Provisional Patent Application Ser. No. 62/594,427 filed Dec. 4, 2017, entitled "Analytical Instruments, Methods, and Components", the entirety of which is incorporated by reference herein.

TECHNICAL FIELD

The present disclosure provides analytical instruments, methods, and components. In particular embodiments, the present disclosure provides variable temperature analytical instruments and methods that can, for example, be used to cryogenically cool samples and analyze samples under those cryogenic conditions.

BACKGROUND

Analytical instruments have been utilized to cryogenically cool samples and then analyze those samples under those cryogenic conditions. These instruments provide many benefits for the analyst, including the ability to analyze samples at low Kelvin (K) temperatures. At these temperatures, the samples and the analysis of same can be subject to many laboratory influences, including laboratory vibrations, for example. Further, it is always a goal of this type of analysis to cool the sample to lower and lower temperatures. Currently, samples have been lowered to temperatures below 10 K. However, even lower temperatures are desired. The present disclosure provides analytical instruments, methods, and components that can be utilized to cryogenically cool samples to lower than 2.8 K or even lower than 0.8 K, for example.

SUMMARY OF THE DISCLOSURE

Variable temperature analytical instruments are provided that can include: at least one heat or cold source configured to generate a temperature; and discrete instrument portions individually thermally coupled to the at least one source.

Methods for maintaining temperatures within a variable temperature analytical instruments are also provided. The methods can include providing a plurality of thermal coupling between a plurality of discrete heat or cold sources to a plurality of discrete portions of the instrument.

DRAWINGS

Embodiments of the disclosure are described below with reference to the following accompanying drawings.

FIG. 4A is a component of an analytical instrument according to an embodiment of the disclosure.

FIG. 4B is a component of an analytical instrument according to an embodiment of the disclosure.

FIG. 4C is a component of an analytical instrument according to an embodiment of the disclosure.

FIG. 5 is a component of an analytical instrument according to an embodiment of the disclosure.

DESCRIPTION

This disclosure is submitted in furtherance of the constitutional purposes of the U.S. Patent Laws "to promote the progress of science and useful arts" (Article 1, Section 8).

Figure 1:
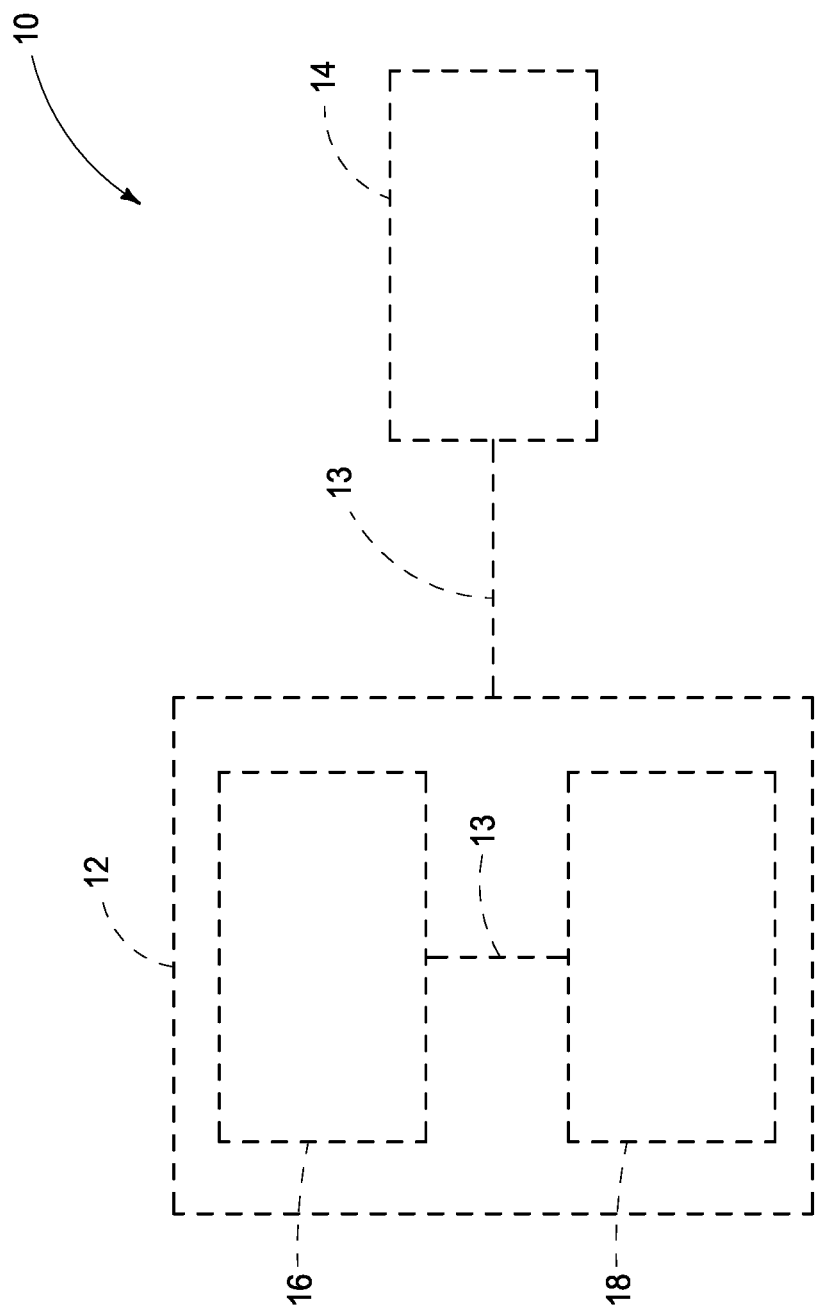
FIG. 1 is a block diagram of an analytical instrument according to an embodiment of the disclosure.

The instruments, assemblies, component, and methods of the present disclosure will be described with reference to FIGS. 1-34B. Referring first to FIG. 1, analytical instrument 10 is provided that includes an analysis component 14 in operative communication with a cooling pod 12. Cooling pod 12 can be configured as a cold source and may include a cryofluid source. The cryofluid source may include a liquefier for example. Cooling pod 12 can include both temperature sources such as a liquefier 16 and a pump assembly 18. This analytical instrument can be considered a variable temperature analytical instrument that can be configured pursuant to the myriad of configurations disclosed herein with or without the myriad of components and assemblies provided herein. For example, analysis component 14 may be fixed in place while pod 12 is mobile in one embodiment. In another embodiment, pod 12 may be fixed in place while analysis component 14 is mobile. In these and other embodiments of the disclosure communications between these components, such as electric, fluid, and/or mechanical can be released/engaged while maintaining or rapidly providing working configurations as desired. This variable temperature analytical instrument can achieve sample analysis temperatures as low as 300 mK and can be used to maintain a sample at a temperature and allow for the visual and/or physical analysis of same while at these low K temperatures.

While cooling pod 12 is shown housing both liquefier 16 and pump assembly 18, this is but one embodiment of the disclosure. Other embodiments of instrument 10 include cold source such as a cold head, cryocooler, and/or a liquefier 16. In the case of a liquefier 16, pump 18b can be housed separately but operatively coupled to one another and/or to a sample analysis component such as a sample chamber 14. In accordance with example implementations, conduit 13 can be operatively engaged between components of instrument 10. Conduit 13 can be configured to convey fluids, electronics, thermally conductive elements, and/or mechanical elements as needed to provide working configurations of the instrument components. In accordance with example configurations, conduit 13 can provide multiple conduits traversing between the components.

In accordance with an example implementation, there can be separation (thermal, pressure, and/or physical) of analysis component 14 from cooling pod 12. This can provide on demand cooling by making fluid helium available at any time to cool the sample within analysis component 14. This configuration can also provide low vibrations and convenient sample access by providing an analysis component with optical ports configured on a platform. The system can also provide sample cool down and/or warm up, wherein the liquefier portion 16 can remain cold and only the analysis component is heated and cooled during the change out of samples. In accordance with example implementations, there can be a universal connection of the cooling pod 12 to the analysis component which can provide flexibility in the use and engagement of the analysis component.

Figure 2:
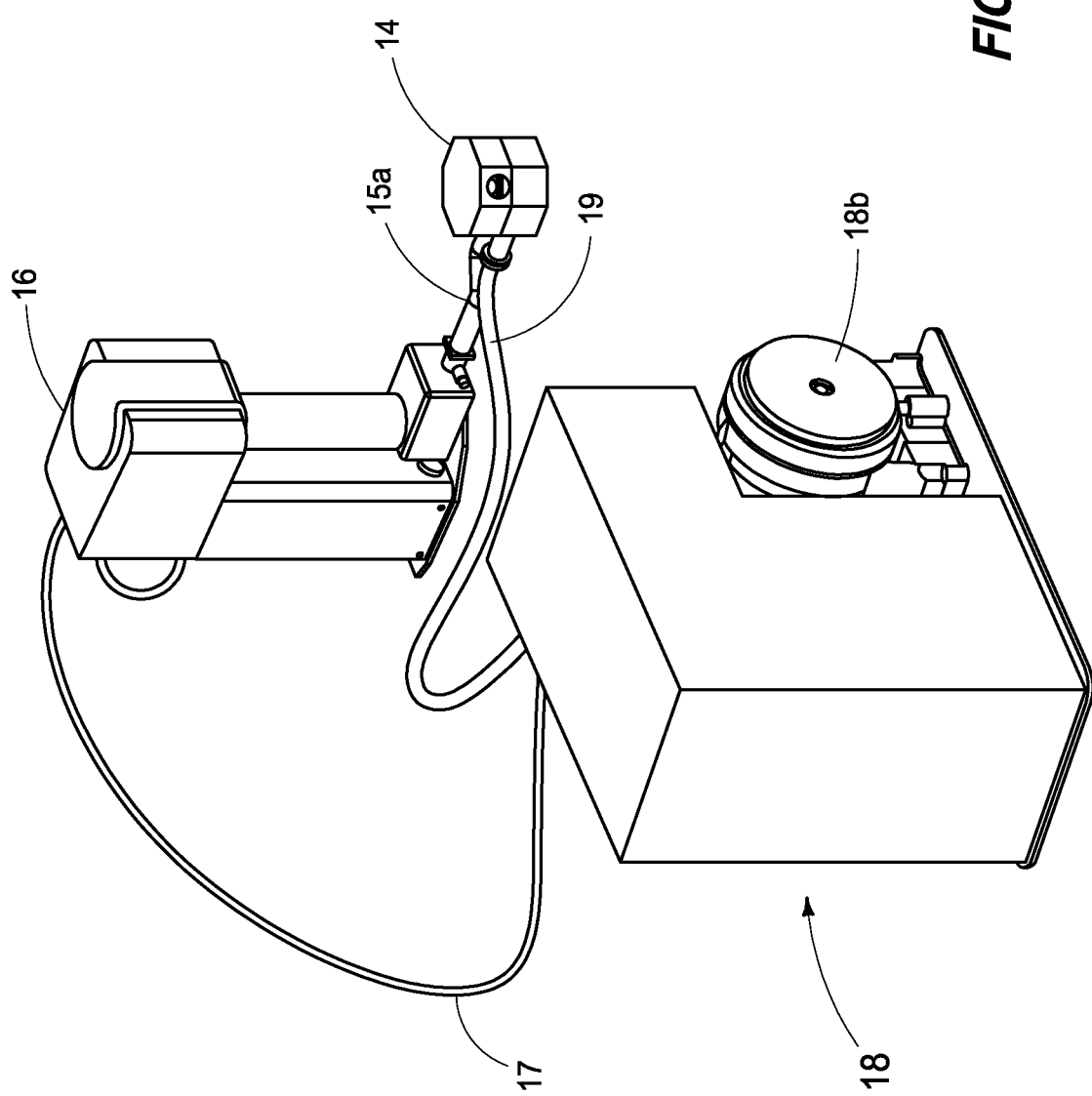
FIG. 2 is an analytical instrument according to another embodiment of the disclosure.

Analytical instrument 10 can provide low temperature with high cooling power; temperatures being as low as 300 mK can be achieved, for example. The instrument and/or system can utilize cooling from analysis component exhaust gas which can reduce heat loads on the sample analysis component, allowing more loads per user input. Instrument 10 can also provide steady state or single shot operation for the operator. The instrument and/or system can be variably temperature controlled. The instrument and/or system can be close cycled, automated, and a fully integrated instrument solution. Referring next to FIG. 2, an alternative configuration of instrument 10 is shown that includes liquefier 16; analysis component 14; conduit 19 configured as an exhaust conduit from component 14; conduit 17 configured as an inlet conduit to liquefier 16; conduit 15a configured to convey cooling fluid to analysis component 14; and pump 18b within a pump assembly 18. In accordance with example implementations, pump 18b can be configured to pull or withdraw cryogen such as helium out of analysis component 14. An additional compressor (not shown) can be utilized to compress the cryogen, in a tank for storage and/or withdrawal, and transfer to liquefier 16, thereby providing a loop for transfer of cryogen between the analysis component, the pump assembly 18, and liquefier 16. Liquefier 16 may have a separate compressor configured to maintain its cold head.

Figure 3:
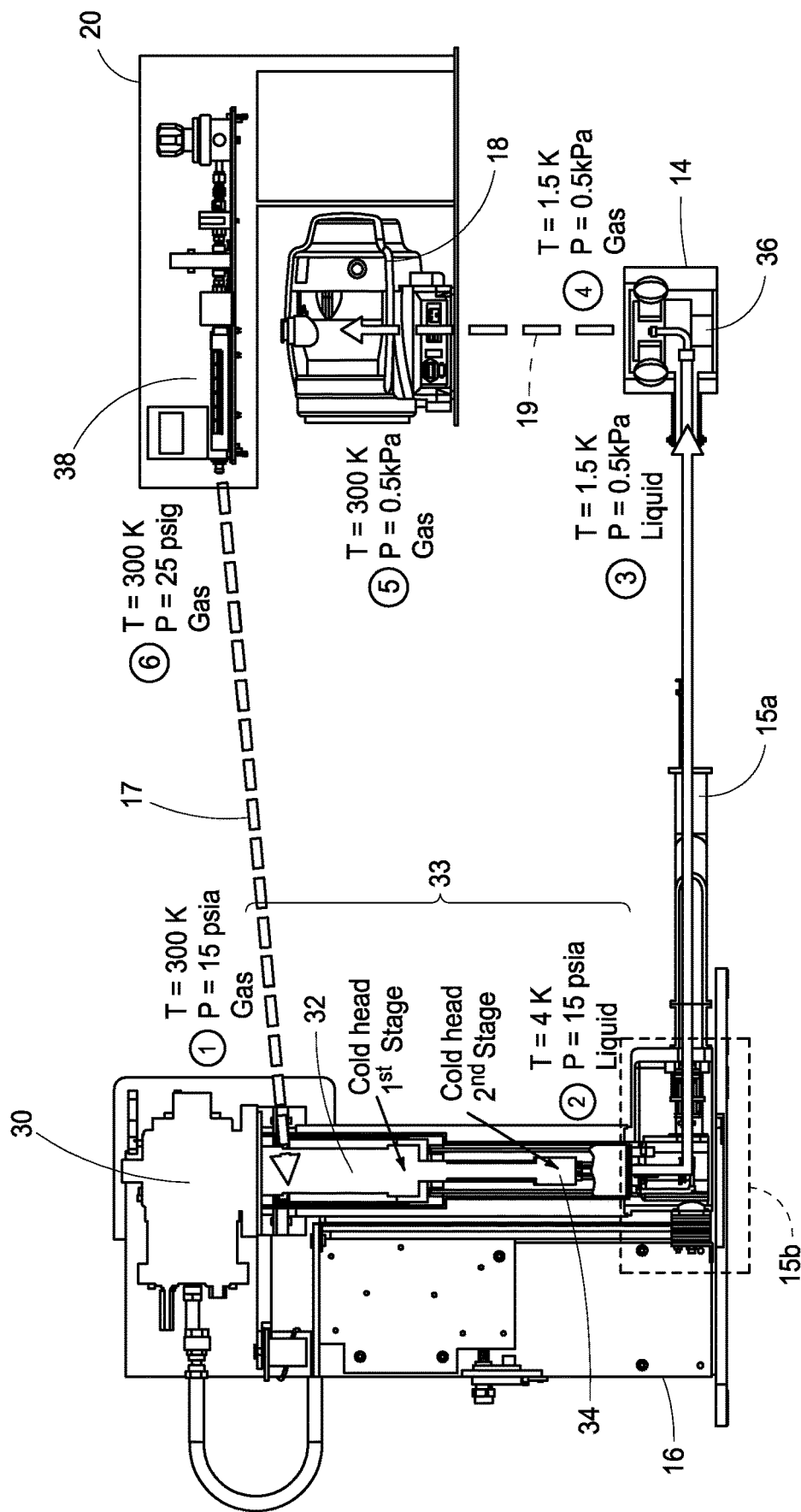
FIG. 3 is a more detailed view of the analytical instrument of FIG. 2 according to an embodiment of the disclosure.

Referring next to FIG. 3, in accordance with example implementations, liquefier 16 can include a cold head 30 configured to cool fluid received as a gas and provide liquid with two stages, a first stage 32 and a second stage 34. First stage 32 can be maintained at 30 K and second stage 34 can be maintained as low as 3-4 K, for example. Implementations of the instruments of this disclosure utilize the temperature of these stages to maintain other components of the instrument at like temperatures. Fluid transfer components, pressure barriers, and heat exchangers are some of the components of the present disclosure that may utilize the temperatures of these stages via a thermal connection with the stages to facilitate transfer and/or maintenance of sample chamber temperatures in the low K's. These and other or additional stages can provide for distribution of variable temperature throughout an instrument.

Example fluids that can be used within instrument 10 include, but are not limited to helium and its various isotopes. Cold head 30 can provide for liquefication of helium received from pump assembly 18 or a reservoir. Within portion 15b of liquefier 14 can be a vacuum chamber that encloses analytical components (40a-f) of the present disclosure. Liquefied helium can be provided through this portion and the analytical components to a pot 36 within analysis component 14, and pot 36 can reach a temperature of 1.5 K as pump 18b exhausts helium from pot 36 and recycles the helium through instrument 10 while maintaining pot 36 temperature at 1.5 K. A sample being analyzed can be placed in thermal connection with pot 36 and hence be maintained at a temperature as low as 1.5 K and analyzed at this temperature. The components of instrument 10 can be operatively controlled using processing circuitry 38 and flow regulation devices including valves, pressure gauges/transducers, mass flow meters/controllers, and associated power supplies and signal path electronics. Processing circuitry can include a personal computing system that includes a computer processing unit that can include one or more microprocessors, one or more support circuits, circuits that include power supplies, clocks, input/output interfaces, circuitry, and the like. Generally, all computer processing units described herein can be of the same general type. The computing system can include a memory that can include random access memory, read only memory, removable disc memory, flash memory, and various combinations of these types of memory. The memory can be referred to as a main memory and be part of a cache memory or buffer memory. The memory can store various software packages and components such as an operating system.

The computing system may also include a web server that can be of any type of computing device adapted to distribute data and process data requests. The web server can be configured to execute system application software such as the reminder schedule software, databases, electronic mail, and the like. The memory of the web server can include system application interfaces for interacting with users and one or more third party applications. Computer systems of the present disclosure can be standalone or work in combination with other servers and other computer systems that can be utilized, for example, with larger corporate systems such as financial institutions, insurance providers, and/or software support providers. The system is not limited to a specific operating system but may be adapted to run on multiple operating systems such as, for example, Linux and/or Microsoft Windows. The computing system can be coupled to a server and this server can be located on the same site as computer system or at a remote location, for example.

In accordance with example implementations, these processes may be utilized in connection with the processing circuitry described. The processes may use software and/or hardware of the following combinations or types. For example, with respect to server-side languages, the circuitry may use Java, Python, PHP, .NET, Ruby, Javascript, or Dart, for example. Some other types of servers that the systems may use include Apache/PHP, .NET, Ruby, NodeJS, Java, and/or Python. Databases that may be utilized are Oracle, MySQL, SQL, NoSQL, or SQLLite (for Mobile). Client-side languages that may be used, this would be the user side languages, for example, are Python, LabVIEW, MATLAB, ASM, C, C++, C#, Java, Objective-C, Swift, Actionscript/Adobe AIR, or Javascript/HTML5. Communications between the server and client may be utilized using TCP/UDP Socket based connections, for example, as Third Party data network services that may be used include GSM, LTE, HSPA, UMTS, CDMA, WiMax, WiFi, Cable, and DSL. The hardware platforms that may be utilized within processing circuitry include embedded systems such as (Raspberry PI/Arduino), (Android, iOS, Windows Mobile)—phones and/or tablets, or any embedded system using these operating systems, i.e., cars, watches, glasses, headphones, augmented reality wear etc., or desktops/laptops/hybrids (Mac, Windows, Linux). The architectures that may be utilized for software and hardware interfaces include x86 (including x86-64), or ARM.

In accordance with example implementations, within bucket section 33 of liquefier 16 and pot 36 there is a pressure differential. As can be seen in FIG. 3, liquefier 16 contains first and second cold head stages when performing the fluid liquefaction. Beginning at 1, the instrument provides a temperature of 300 K and a pressure of 15 psia. After proceeding through the first and second stages, a liquid is provided at 2, where a temperature of 4 K and a pressure of 15 psia exists while at analysis component 14 (3), a pressure of 0.5 kPa exists, thereby providing a pressure differential between the liquefier and the analysis component. Further, at 4 a temperature of 1.5 K exists with a pressure of 0.5 kPa but an exhaust is provided at this temperature to 5 at pump 18b through an expansion coefficient with the temperature being 300 K and a pressure of 0.5 kPa, thereby providing a transmission of the fluid from 2 at bucket 33 to pump 18b at 5. These temperature differences as well as pressure differences are maintained using components of the present disclosure. Further, the present disclosure provides components, instruments and/or methods that utilize these temperature and pressure phases to more efficiently maintain and provide temperatures within the instrument to allow for more rapid and reliable cooling and analysis.

In accordance with example implementations, instrument 10 can include a temperature source such as liquefier 16 that is configured to generate a constant temperature. As shown here this can be considered a cold source. A cold source can be matter that maintains less heat in relation to other matter. This temperature source can have multiple stages with one stage providing one temperature and another stage providing another temperature, with, for example, one stage having a higher temperature than the other stage.

Instrument 10 can include an analysis component having portions that are discretely thermally coupled to the temperature source. For example, the one stage can be thermally connected with one discrete portion of the analysis component and the other stage can be thermally connected with another discrete portion of the analysis component. The one discrete portion of the analysis component can be a first mass thermally insulated from the other discrete portion and about a conduit operatively connected with the analysis component, for example. The other discrete portion of the analysis component can be a second mass in thermal connection with a conduit of the sample analysis component. The temperature source can be configured to provide a fluid via the conduit to the analysis component. One stage of the temperature source can be thermally coupled with one discrete portion of the conduit and another stage can be coupled with another discrete portion of the conduit.

In accordance with example implementations, thermal coupling can be provided to discrete portions of the instrument from temperature sources of the instrument. Thermal coupling can be provided from at least two of the stages of the temperature source to at least two different discrete portions of the instrument. These discrete portions can be portions of conduit within the instrument. The conduit may be part of and/or bound by a mass to which thermal connection is provided. Accordingly, there can be discrete masses about and/or as part of a conduit, a pressure barrier, a heat exchanger, and/or other component of instrument 10. The alignment of the thermally connected discrete portions can be such that lowest temperature is bound by higher temperature to form what may be considered a temperature shield. For example, two discrete portions of a conduit can be thermally coupled to stages of a temperature source. The discrete portions may have a mass associated therewith, for example, a second mass thermally connected with the second stage and a first mass thermally connected with the first stage. The masses may be aligned along the conduit with the second mass aligned closest to the temperature source and between the first mass and the temperature source.

Referring to FIGS. 4A-12, embodiments of an analytical component 40a-f are provided. Analytical component 40 can be provided between liquefier 16 to the analysis component 14. Components 40a-f can be housed under vacuum as part of the liquefier 16. In accordance with example implementations, component 40a-f can include first and second conduits 44a and 46a. Conduit 44a can be configured to have a less restrictive resistance to flow than conduit 46a. For example, the length and/or inner diameter of the conduits may be configured to provide this difference in resistance to flow. These conduits can extend between the liquefier and the analytical component as shown. As stated, a housing can be about the conduits to maintain the conduits within a vacuum. The vacuum can be provided by a vacuum pump or a cryopump, for example.

In accordance with the embodiment of FIG. 4B, multiple conduits can extend between the liquefier and the analytical component. For example, conduits 44b, 45b, 46b, and 49b can extend between a liquefier and an analysis component. These conduits may be configured to provide the same or different resistances to flow. At least two of the conduits may be bound by the same mass 48b, for example. The temperature of mass 48b can be dictated to provide for a vapor lock of the fluid traversing conduits 44b and 45b. Accordingly, manipulating the temperature of mass 48b can control the flow of fluid through the conduits. Further, additional conduits may also be provided that are bound by masses that are coupled to heat sources. For example, masses 47b and 50b can be about conduits 46b and 49b. These conduits may provide the same or different resistances to flow. In accordance with example implementations, each of the masses can be individually controlled to provide different levels of temperature. One level can form a vapor lock within the conduit and another level can provide free flow of fluid within the conduit. Accordingly, the masses can be used to control the overall flow between the liquefier and the analysis component. For example, with all masses below vapor lock temperature, fluid proceeds through all conduits; with one or more at or above vapor lock temperature flow is restricted to the conduits having masses below vapor lock temperature.

Referring next to FIG. 4C, according to another embodiment, analytical component 40c is depicted that includes manifold 42d which provides a juncture that extends to conduits 44c and 46c. Conduit 44c can provide higher flow rates, less resistance to flow, at certain temperatures, while conduit 46c can provide a greater pressure drop, greater resistance to flow, and thereby support lower temperature operation.

In accordance with example implementations, component 40c can include a heating block 48c which can facilitate the formation of a vapor lock of fluid passing through conduit 44c, thereby blocking conduit 44c as desired, allowing only the transfer of fluid via conduit 46c. In accordance with example implementations, conduit 46c flowing while conduit 44c is blocked can provide for a steady state of fluid transfer between the liquefier and the analysis component, thereby allowing for a consistent lower temperature configuration in the analysis component. Utilizing components 40a-d, significant reduction in time for cool down, reduced instrument footprint, and/or reduced instrument vibration can be achieved. For example, fluid helium through conduits 44 and then 45 can flow at a significantly higher rate and with greater volume compared to 46 alone. Configured accordingly, a rapid cooldown of the analysis component can occur by flushing a large volume of fluid helium through the component without a significant pressure drop. A vapor lock between conduits 44 and 45 can be induced by applying heat to 48. Once locked, fluid transfer can be dominated by conduit 46, which is more resistive and initiates a pressure drop, thus resulting in a lower temperature at the analysis component. Additionally, with these configurations, fluid helium can be transferred over some length between the liquefier and analysis component. For example, the liquefier can be removed from the bench, resulting in lower vibrations and more space on the bench.

In accordance with additional implementations, and as part of the distributed cooling provided herein, component 40 can include at least one discrete mass 49c that may be thermally connected with the second stage of the liquefier 16, hence having a temperature, in some implementations, of about 4 K. Additional discrete masses may be provided that are thermally coupled with portions of the component. For example, the first stage of the liquefier can be coupled with a conduit exiting a heating mass of the component. Between mass 49c and another junction such as manifold 50c can be another conduit 45c. Conduit 45c can have an internal diameter that is larger than conduit 44c which is larger than conduit 46c and may be configured as a stainless steel tube. Accordingly, variable temperature analytical instrument components are provided that can include a first and second conduits configured to receive fluid from a cryofluid source and provide same to an analysis component. The intake can be received from liquefier 16 for example.

Figure 6:
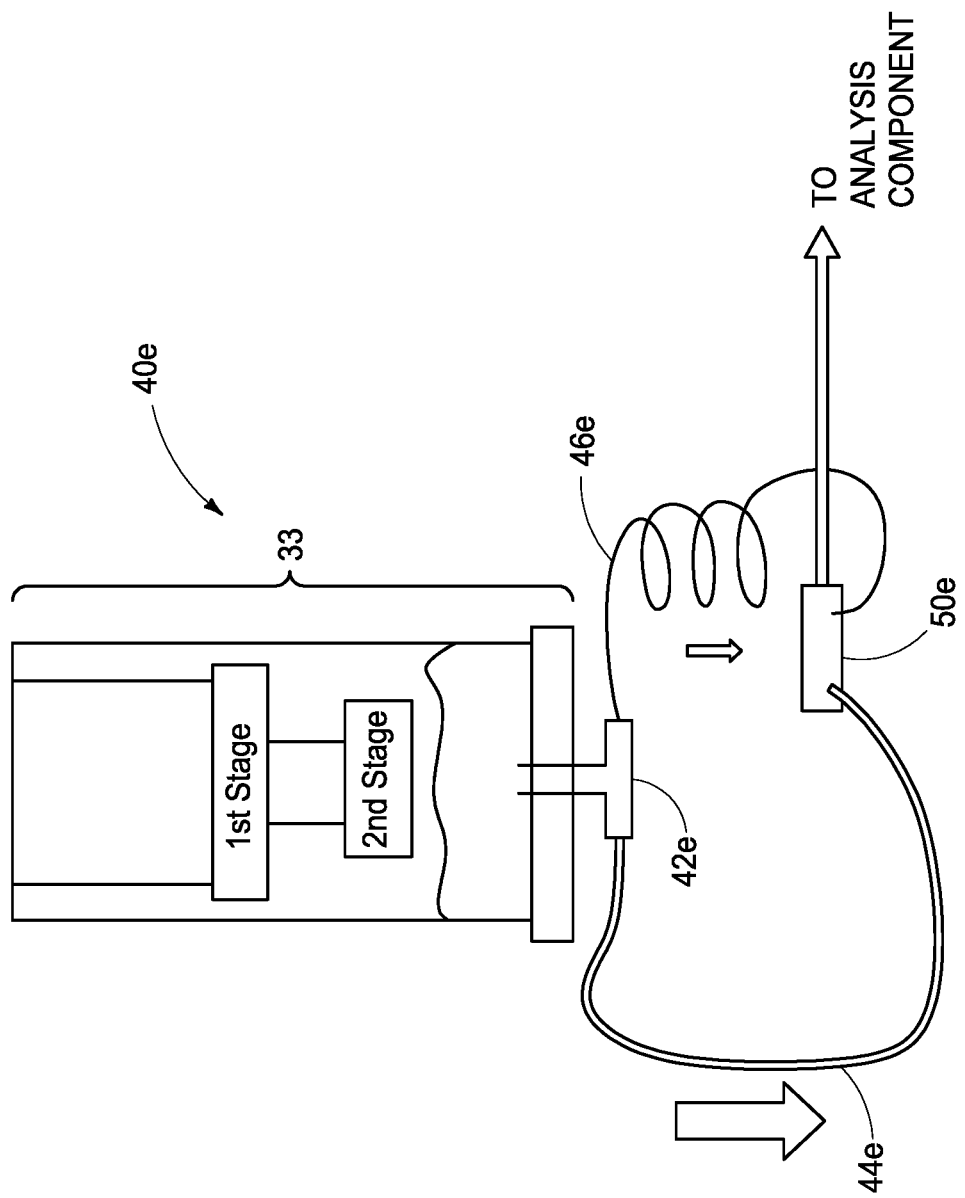
FIG. 6 is a component of an analytical instrument according to an embodiment of the disclosure.

Referring to FIGS. 5-6, example depictions of components 40d and 40e are shown. Parts of these components have like functionality to the parts of the components previously described, but may include additional parts. For example, component 40d includes mass 49d that can be thermally connected to a stage of liquefier 16 and maintained at 4 K, for example. Referring to FIG. 6, component 40e can likewise include some, but not all, of the parts of previously described components.

Figure 7:
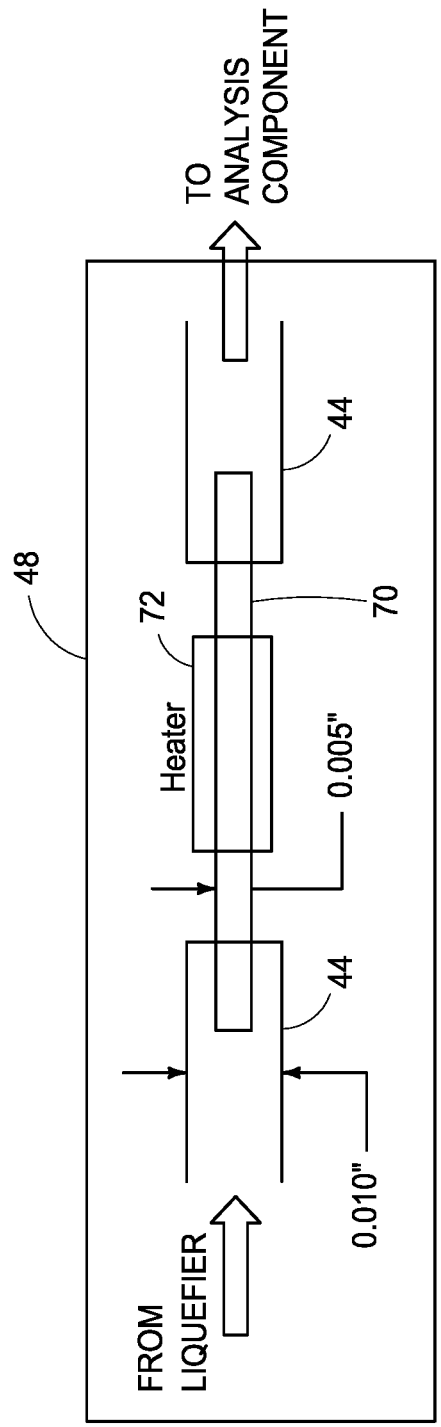
FIG. 7 is a portion of a component of an analytical instrument according to an embodiment of the disclosure.

Referring to FIG. 7, sub-component assembly 48 is a configuration of masses 48a-d. Conduit 44 can be coupled about another conduit 70 having a diameter in at least one cross section that is less than the diameter of conduit 44. A temperature controlled mass 72 can extend about conduit 70. By providing a smaller diameter conduit within mass 72, the opening or closing of the conduit using heat to produce a vapor lock may be reliable. Accordingly, the large diameter conduit can be a small section of tubing within the heater. This section can be about 0.005 inches in diameter, while the large diameter conduit can be 0.010 inches. In this section, by providing this small section about the heater, vapor lock can be readily and reliably induced.

Figure 8:
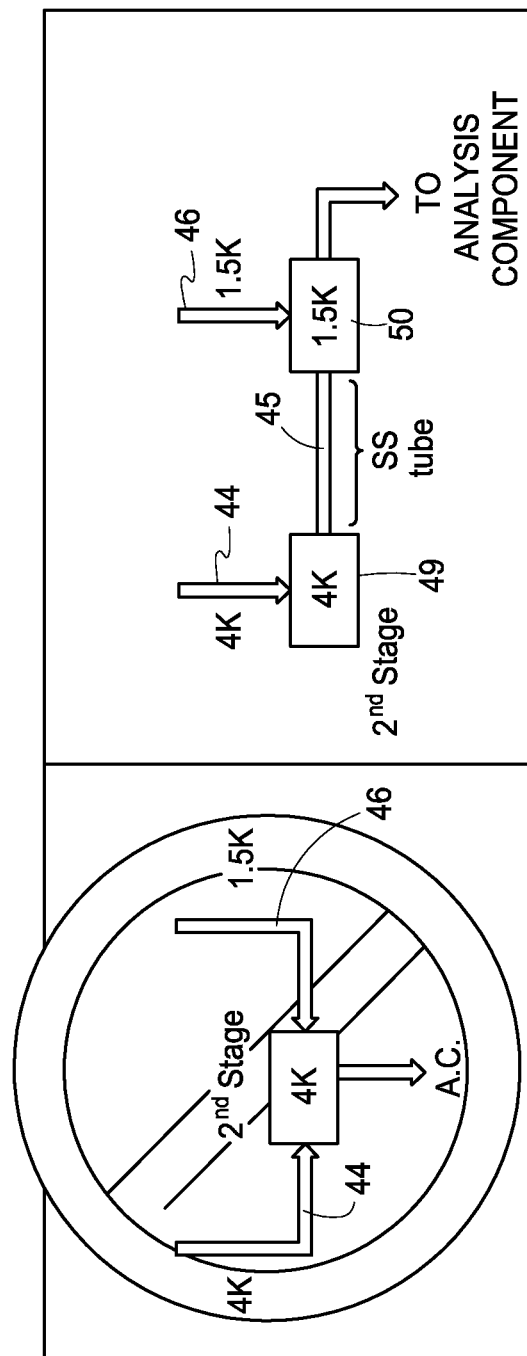
FIG. 8 is a depiction of two configurations of a component of an analytical instrument according to an embodiment of the disclosure.

Referring to FIG. 8, the analytical component can include discrete second and third masses 49 and 50 coupled to one another via a fourth conduit 45. Mass 49 can be a part of and define one of the intakes of the third mass 50. These masses may be maintained at difference temperatures with mass 49 being maintained at 4 K and mass 50 being maintained at 1.5 K. Accordingly, condensed liquid can be dynamically provided from a condenser through at least one of two conduits to a sample chamber.

Accordingly, masses 49 and 50 can be kept thermally insulated from one another but also at lower temperatures to allow for rapid cool down as desired. In accordance with example implementations, conduit 44 can extend to junction 49 which is maintained at second stage cooling 4 K which is thermally separated from the junction 50 which is maintained at 1.5 K during steady-state. In accordance with example implementations, when a sample is changed out or a rapid cool down is required, this 1.5 K block may warm up; however, the 4 K block can stay at a relatively stable temperature, and this temperature can be utilized with the fluid to rapidly cool the sample chamber.

Figure 9:
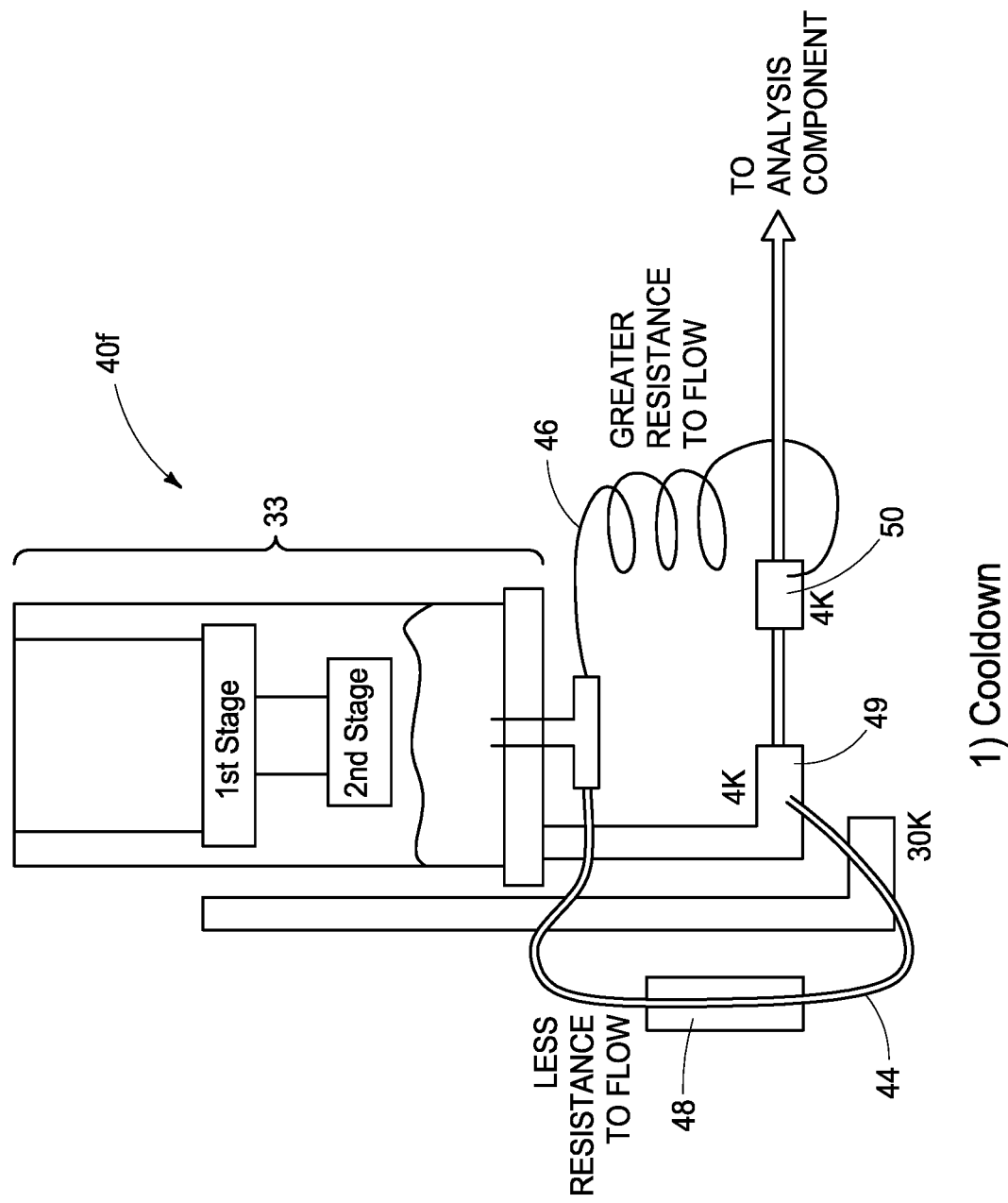
FIG. 9 is a depiction of a component of an analytical instrument in at least one configuration according to an embodiment of the disclosure.
Figure 10:
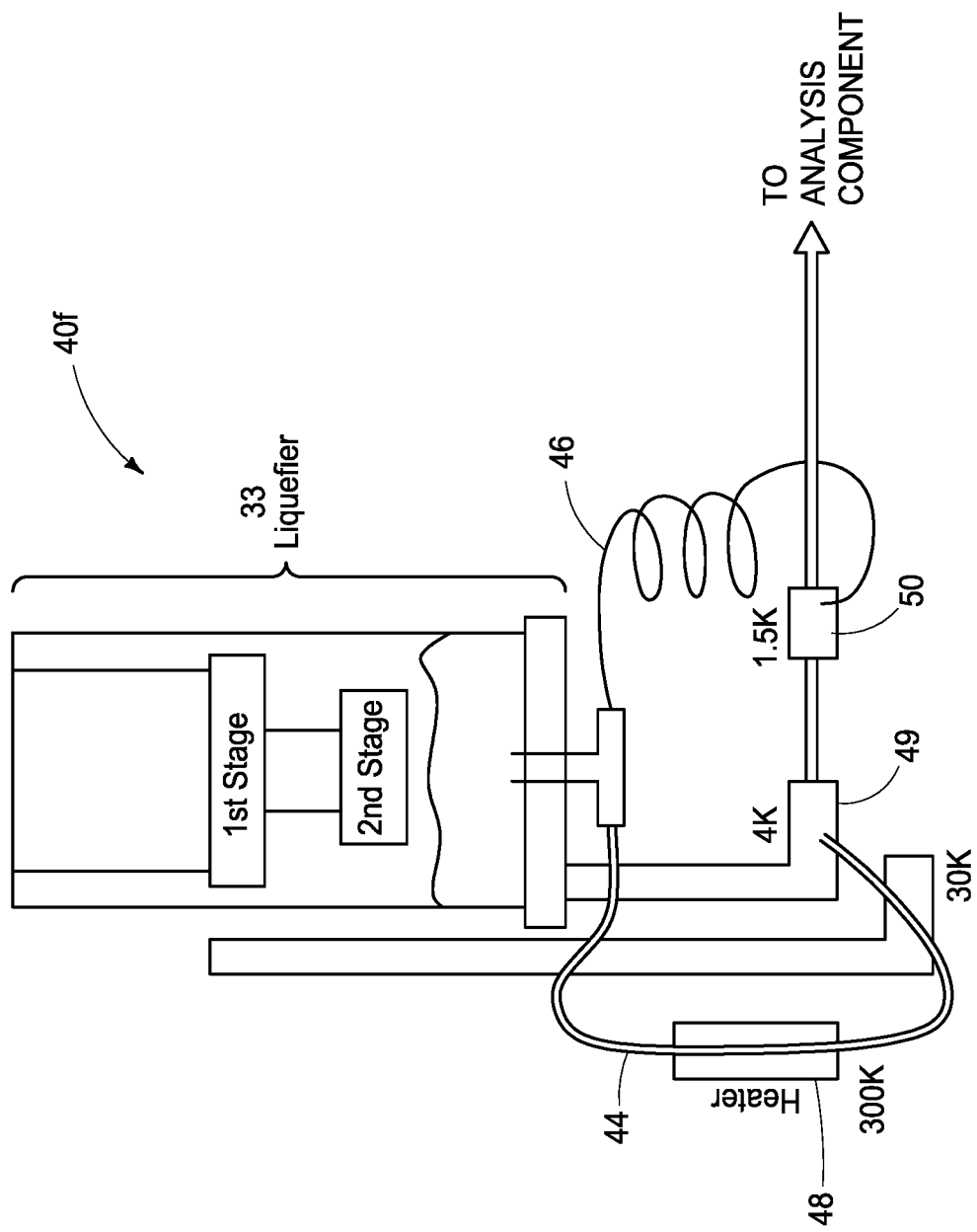
FIG. 10 is a depiction of a component of an analytical instrument in another configuration according to embodiment of the disclosure.
Figure 11:
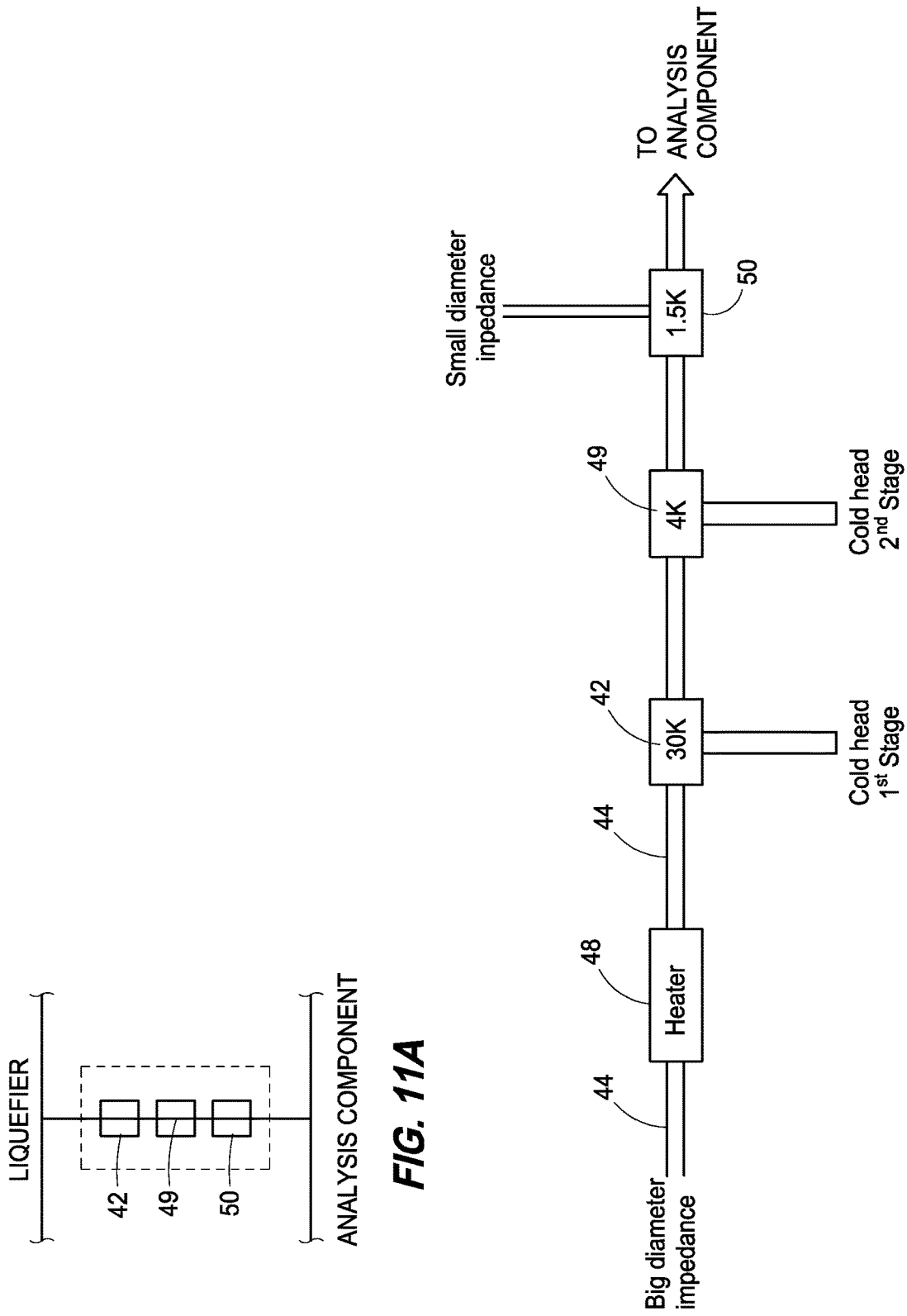
FIG. 11A is a depiction of a component of an analytical instrument according to an embodiment of the disclosure.
FIG. 11B is a depiction of a component of an analytical instrument according to an embodiment of the disclosure.

Referring to FIGS. 9-10, in accordance with other example implementations, when analysis component 14 needs to be cooled quickly, for example, in a situation where a new sample has been added and analysis component 14 has been opened, the vapor lock can be removed from conduit 44 and a higher flow of fluid from liquefier 16 can be transferred via conduit 44, thereby cooling analysis component 14 using the configuration of FIG. 9, the cool down.

Heating block mass 48 of component 40 can precondition the temperature of fluid passing through conduit 44 to facilitate variable temperature control in analysis component 14, for example in the range of 1.5 K-300 K. Because the rate of flow is temperature dependent, heating block 48 can also adjust the temperature to vary the flow rate of fluid through conduit 44 as another method for facilitating variable temperature control in the sample chamber.

Sample analysis startup or cool down configuration and sample analysis steady-state are shown in FIGS. 9-10. In accordance with example implementations conduit 44 can have an interior diameter in one cross section of 0.010 inches as compared to the interior diameter of conduit 46 of 0.005 inches.

Referring to FIGS. 11A and 11B, between the liquefier and the analysis component discrete masses 42, 49, and 50 may be aligned in series with at least two of the masses being maintained at different temperatures. For example, mass 42 can be maintained at 30 K by being thermally coupled to an appropriate stage of the liquefier, mass 49 can be maintained at 4 K by also being thermally coupled to an appropriate stage of the liquefier. Depending on the configuration of the analysis component, mass 50 may be maintained at 1.5 K during steady state or 4 K during cool down.

Using these masses in series about the conduit having the least resistance to flow, heat load on pot 36 and analysis component 14 can be reduced. For example, when mass 48 is heated to provide a vapor lock, using this configuration, that heat is hindered from migrating toward analysis component 14 thereby maintaining analysis component 14 and the assemblies leading thereto at a temperature more suited for analysis. It is this configuration that can provide more rapid cool down after sample change. Accordingly, conduit 44 may be discretely thermally connected to portions of masses that are thermally lagged to one another or both stages of cold head 30, for example stage 1 at 30 K and stage 2 at 4 K, positioned downstream of mass 48. These thermal lagging points also facilitate a more expeditious cool down of conduit 44 after the heating of mass 48 is disengaged.

For example, referring again to FIGS. 9 and 10, during cool down, mass 48 is shown in the heater off configuration, allowing for fluid to be provided to analysis component 14 via both conduits 44 and 46, and the stages of cooling about junctions 49 and 50 both around 4 K. Referring to FIG. 10, when steady-state below 4 K is desired within analysis component 14, mass 48 can be heated to approximately 100 K or greater which causes vapor lock within conduit 44 and large flow of fluid through conduit 44 is stopped, while small flow of fluid is provided through conduit 46, thereby providing a 1.5 K temperature at junction 50 of conduit 46 with the pot 36.

Figure 12:
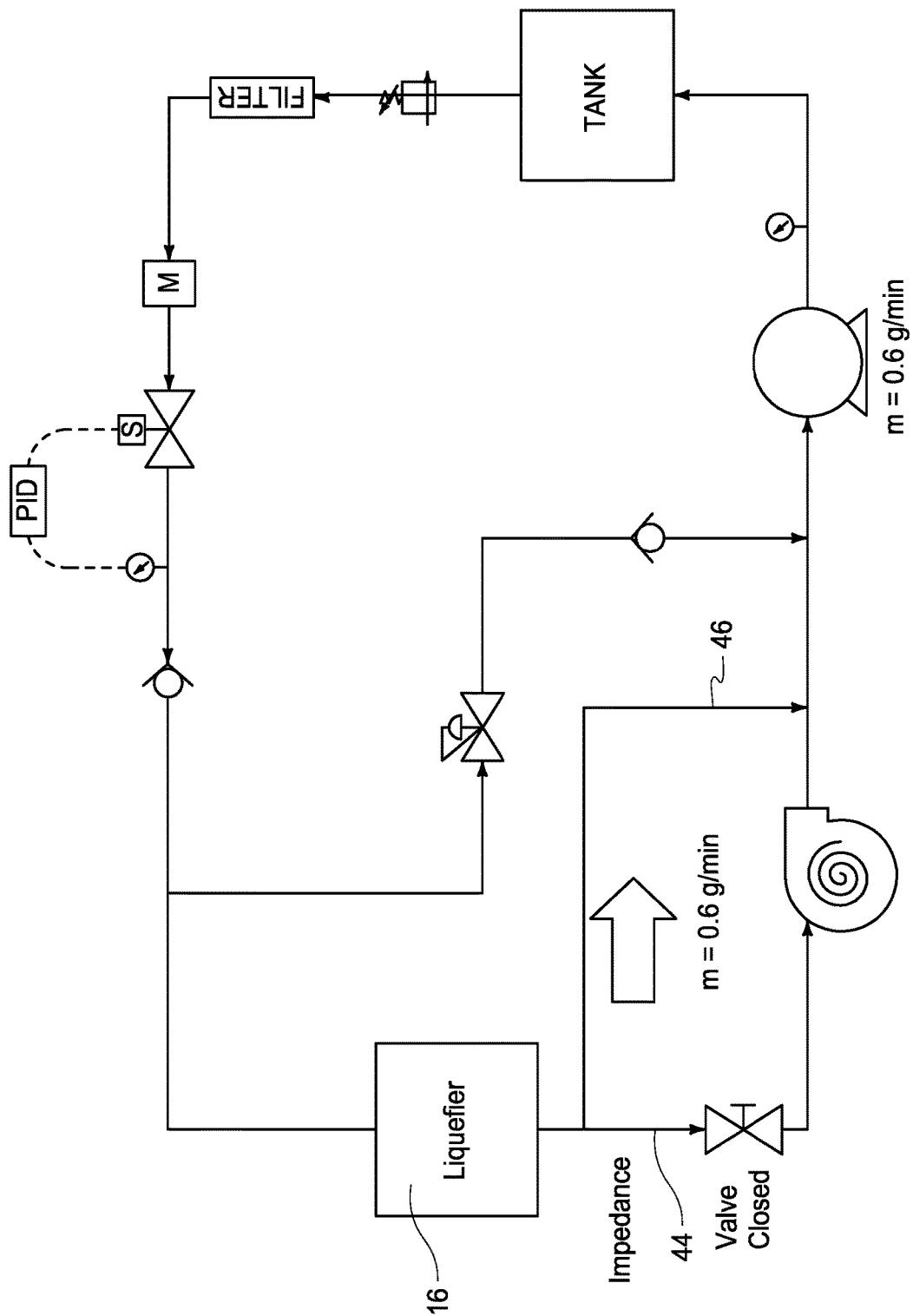
FIG. 12 is a flow diagram that can be utilized in accordance with analytical instruments according to an embodiment of the disclosure.

Referring to FIG. 12, the analytical instruments of the present disclosure can have closed loop control wherein a compressor or a pump can provide the necessary pressure differentials along a conduit to transport cryogen such as helium and/or create low pressure differentials across an analytical component having conduits 44 and/or 46.

Figure 13:
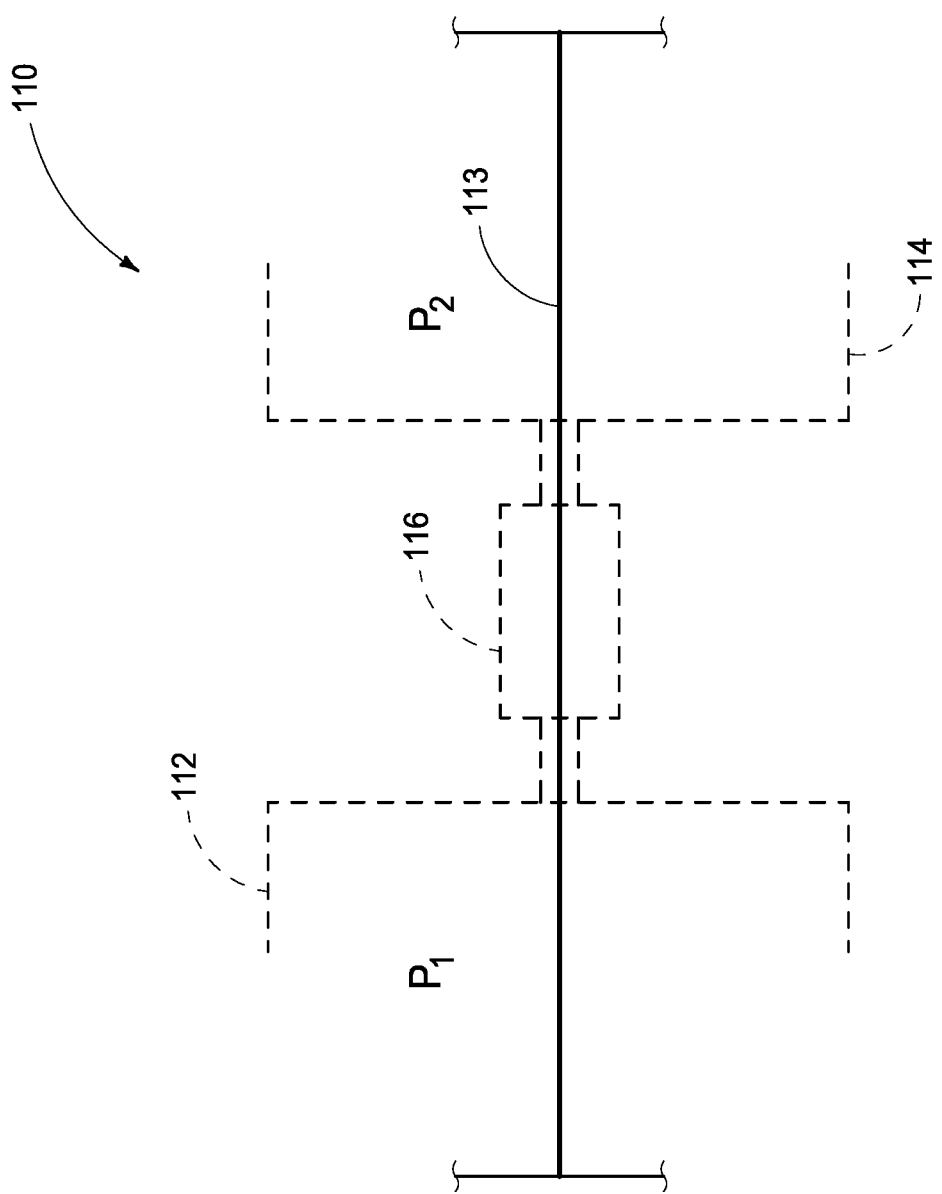
FIG. 13 is a depiction of a component of an analytical instrument according to an embodiment of the disclosure.

In accordance with another embodiment of the disclosure, a pressure barrier component 110 is shown in FIG. 13 that includes a first component 112 separated from a second component 114. The first component 112 can be separated from second component 114 by a pressure barrier component 116, and remain thermally connected through conduit 113. In accordance with example implementations, the first component 112 can be of a different pressure than second component 114, and pressure barrier component 116 can be utilized to separate these pressures, maintaining one at one pressure while another pressure of another component is changed. Accordingly, component 116 can include a conduit 113. This conduit can be configured to extent between two chambers having different pressures and provide one or more of fluid, electrical, and/or mechanical passageways.

For example, pressure barrier component 116 can be designed to withstand atmospheric pressure or greater within component 112, and an ultra high vacuum within component 114. This can be achieved by material choices that allow minimal helium permeation (ceramic or metal for example), and a structural design that can withstand great pressure differentials. Pressure barrier component 116 also can also support conduit 113 with a low thermal conductance structure. This structure can provide the pressure barrier (i.e. minimal helium permeation and structural design that can withstand great pressure differentials). The low thermal conductance of the support structure results from a combination of material choices (ceramic for example) and geometry (small cross-sectional area). This configuration has applications beyond the analytical instruments described herein, but in accordance with example implementations can be utilized according to the configurations that follow. As above, conduit 113 can convey, fluid, thermal conductivity, mechanical, and/or wiring.

Figure 14:
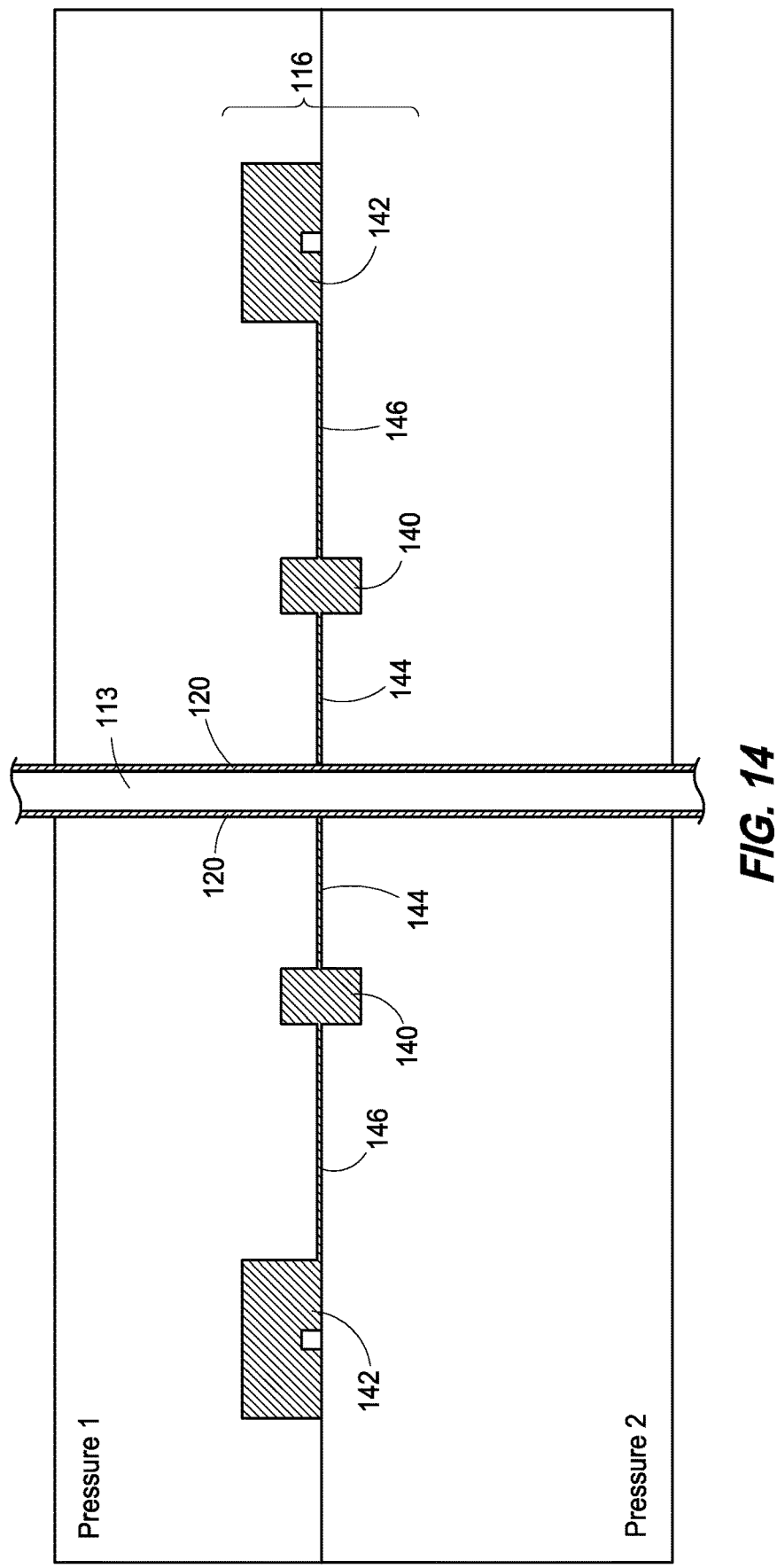
FIG. 14 is a depiction of a component of an analytical instrument according to an embodiment of the disclosure.
Figure 15:
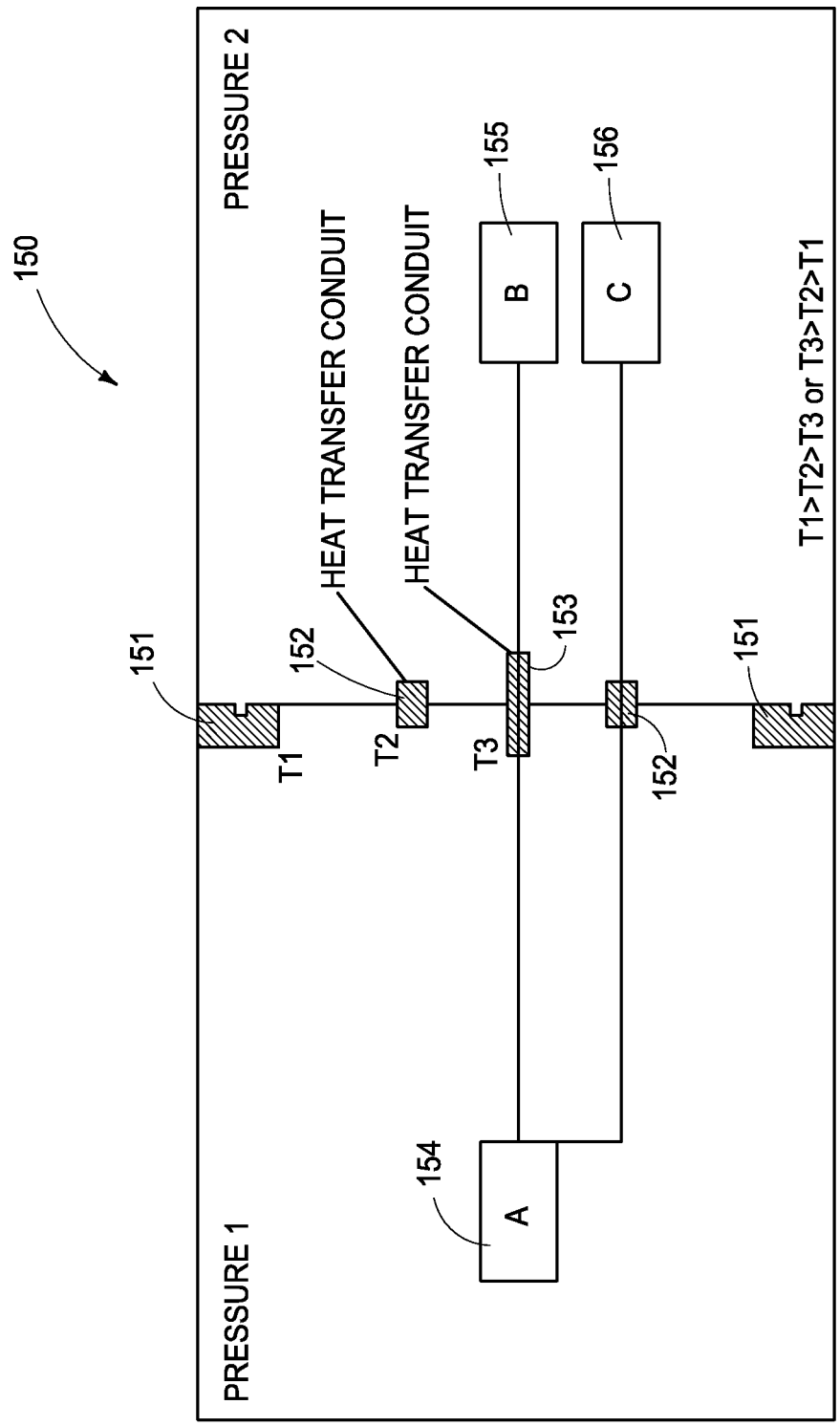
FIG. 15 is a depiction of a component of an analytical instrument according to an embodiment of the disclosure.

With respect to FIG. 14, at least one configuration is shown where component 116 includes mass 142 at room temperature thermally separated by insulating member 146 from a mass 140 that can be considered a heat transfer conduit thermally coupled with a first stage which is thermally separated via an insulating member 144 from a mass 120 about conduit 113 which is thermally coupled with a second stage. In accordance with example implementations, these masses can be considered discrete from one another and thermally coupled to discrete portions of the component and/or the instrument of which the component is a part. Stages can be maintained through the providing of a cryogen, or through conduction at different temperatures. In accordance with example embodiments, the combination of masses 142, 140, and/or 120 within the structure as well insulating members therebetween can complete the pressure barrier. This structure with or without one or more conduits can act as an interface between the chambers of different pressures.

In accordance with another embodiment (FIG. 15), component 150 can be configured to provide insulation during either heat or cold source 154 transfer between the two pressurized chambers. Accordingly, masses 151, 152, and 153 can be maintained at temperature gradients that can expand outwardly or reduce outwardly. Therefore, the component may provide additional discrete temperature portions 155 and 156 distributed from one or more regions within the instrument. Another example of this analytical component is given in FIG. 33 with example barrier 616. As shown the discrete portions can be junctions (552 or 554), heat shield 803, and/or sample analysis components 806.

Figure 16:
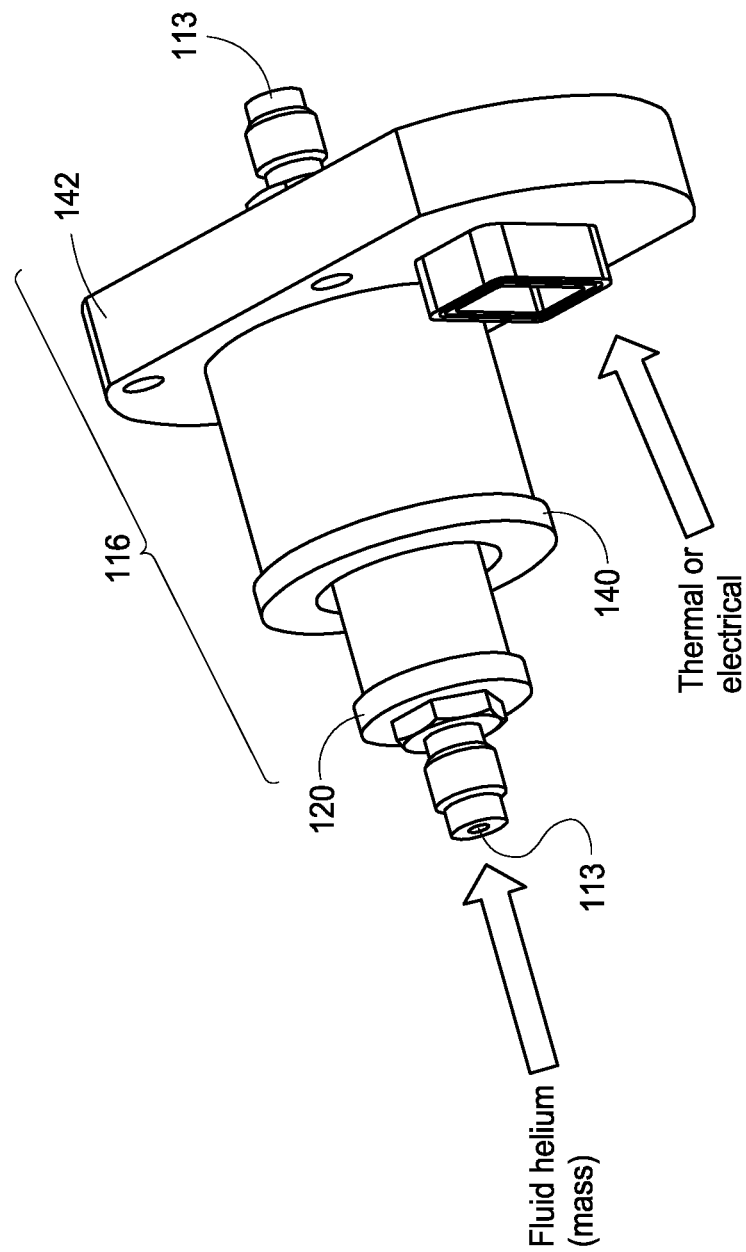
FIG. 16 is a depiction of a component of an analytical instrument according to embodiment of the disclosure.
Figure 17:
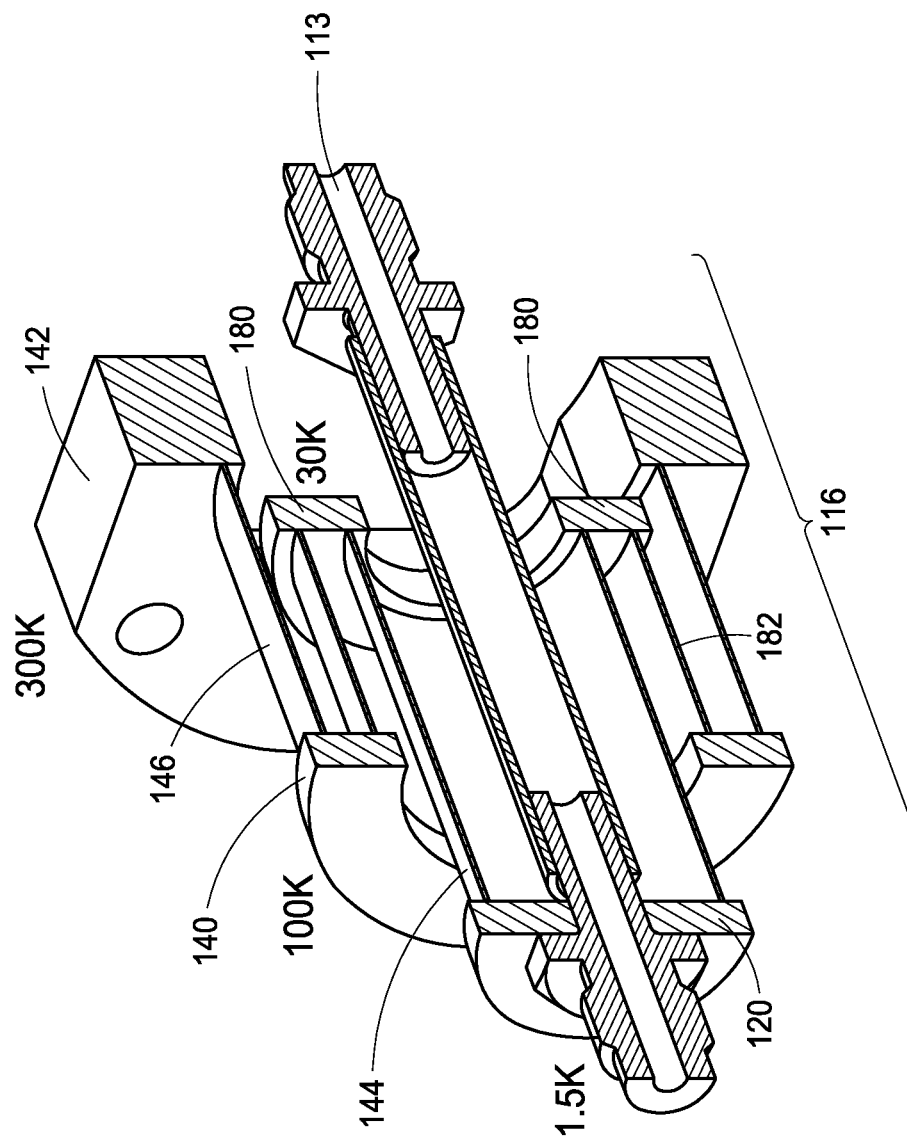
FIG. 17 is a view of the component of FIG. 16 according to at least one cross section.

In accordance with another example configuration, FIGS. 16 and 17 depict a configuration that includes at least two conduits, one for fluid and one for thermal or electrical. As in the previous embodiments mass 116 can separate two chambers having different pressures. Accordingly, mass 142 can be thermally separated from masses 140, 180, and 120 and all separated from one another by insulative members that provide poor thermal path between the masses.

As shown in FIG. 17, mass 142 can be at room temperature but thermally separated from conduit 113 by insulating members 146, 182, and 144 as well as first and second stage masses 180 and 120. These temperatures can be maintained at higher temperatures on the exterior to extremely low temperatures on the interior, while pressures on either side of the barrier can be independently controlled. Again, these discrete masses may be thermally coupled to portions of the instrument to provide distributed temperature transfer, for example, 142 maintained at room temperature, 140 maintained at 100 K, 180 maintained at 30 K, and 120 maintained at 1.5 K.

Accordingly, a variable temperature analytical instrument component is provided that can include a fluid conduit 113 and a mass 120 about a portion of conduit 113. The component can also include another mass such as mass 140 or 142 about mass 120 with mass 120 being maintained at one temperature and mass 140 or 142 being maintained at a second temperature greater than the first temperature, but less than ambient temperature. This component can be used as a sample chamber interface, for example, or another interface where temperature and pressures are important to maintain.

Figure 18A:
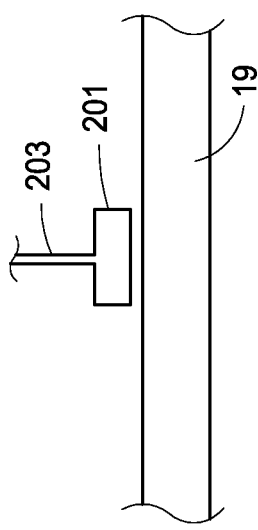
FIG. 18A is a depiction of a component of an analytical instrument according to an embodiment of the disclosure.
Figure 18B:
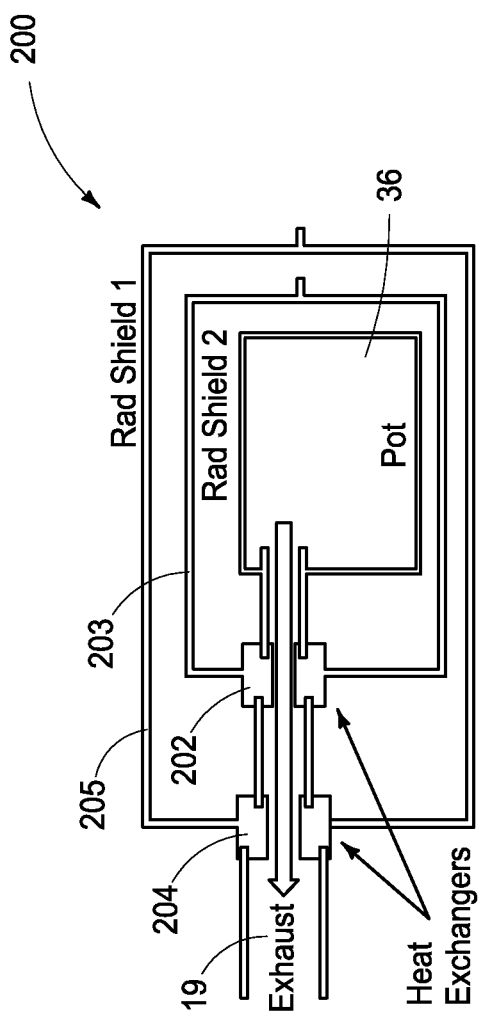
FIG. 18B is a depiction of a component of an analytical instrument according to an embodiment of the disclosure
Figure 19:
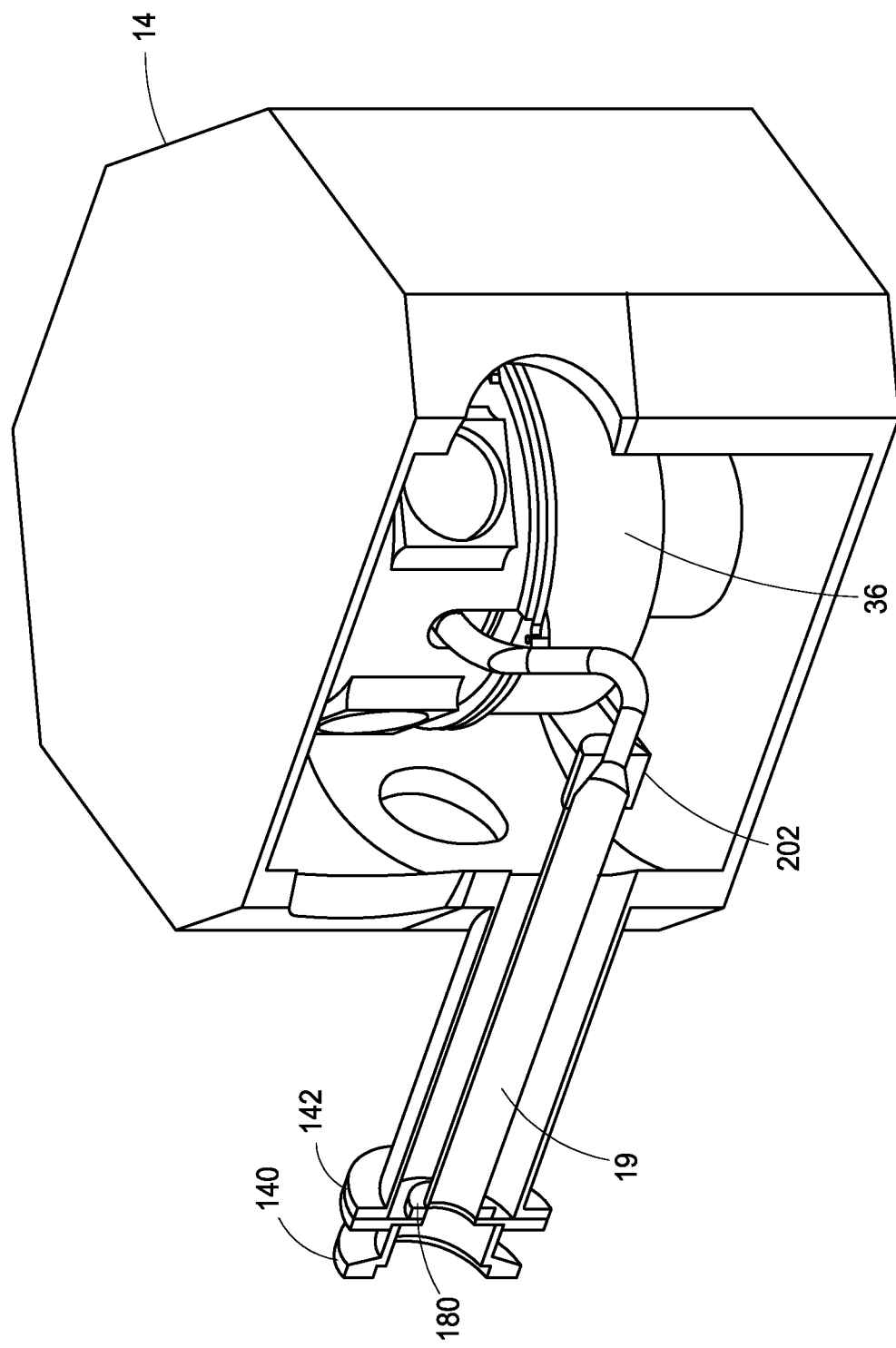
FIG. 19 is depiction of a component of an analytical instrument according to an embodiment of the disclosure.

Referring next to FIGS. 18 and 19, embodiments of a variable temperature analytical instrument heat exchanger component are provided. Referring first to FIG. 18A, the heat exchanger component can include a conduit 19 in thermal communication with at least one thermally discrete mass 201. Discrete mass 201 may be thermally separated from other masses that may be thermally associated with conduit 19. In accordance with example implementations, mass 201 can be configured as a cold source to be coupled to a member 203, for example, to facilitate the transfer of thermal energy. In accordance with example configurations, member 203 can be configured as a thermal shield, however other configurations are also envisioned. For example, member 203 can be coupled to another discrete mass within or associated with the instrument.

Referring to FIG. 18B, a heat exchanger component is shown as operatively associated with pot 36 of analysis component 14. Pot 36 of the analysis component can be considered a reservoir. The reservoir can house cryofluid for example. In accordance with example configurations, conduit 19 can be in thermal communication with first and second thermally discrete masses 202 and/or 204. In accordance with an implementation about pot 36, mass 202 can be thermally connected with a shield member 203 which may be constructed about pot 36 to provide a thermal shield to pot 36. Additionally, mass 204 can be thermally connected with shield member 205 which may be constructed about member 203 to provide a thermal shield to member 203 as well as pot 36. In accordance with example implementations, conduit 19 can be an exhaust of analysis component 14, particularly pot 36. Masses 202 and 204 can be spaced apart from one another along conduit 19 and may be thermally insulated from one another as well. As exhaust from pot 36 exits it warms affecting a temperature gradient with mass 202 having a lower temperature than mass 204. These masses can be independently thermally connected to discrete portions 203 and 205 which can take the form of a heat or radiation shields about pot 36. Accordingly, mass 202 can act as a cold source for shield 203 and mass 204 can act as a cold source for shield 205 thereby providing a temperature gradient between shields 204 and 205. Having shield 205 at a lower than ambient temperature and shield 204 at a lower temperature than 205 can provide a temperature barrier to pot 36. Referring to FIG. 19, analysis chamber 14 can also be configured with a heat exchanger mass 202 that is thermally coupled with a discrete portion of conduit 19 as an exhaust to pot 36. Accordingly, the configuration of FIG. 18B can define a nesting of thermal radiation shields about a reservoir; however, this configuration can be aligned about other portions of the instrument.

Referring next to FIGS. 20-31 another variable temperature analytical instrument heat exchanger component is provided that can be utilized for the evacuation of cryofluid such as helium from pot 36 of analysis component 14 and to the pod. Accordingly, component 300 can include a pot 302 that is configured to receive fluid via intake 304 and have fluid exhausted via exhaust 306 shown here as a conduit. Component 300 can also include mass 308 in fluid communication with conduit 306 and 310, as well as mass 312 in fluid communication with conduit 310 and 314. Conduit 314 can be in fluid communication with pump 18b. Masses 308 and 312 can be considered discrete masses in that they can be thermally separated from one another via conduit 310 for example. Accordingly, each of these masses can be considered and utilized as a cold source for other portions of the instrument or components associated with the instrument.

Figure 20:
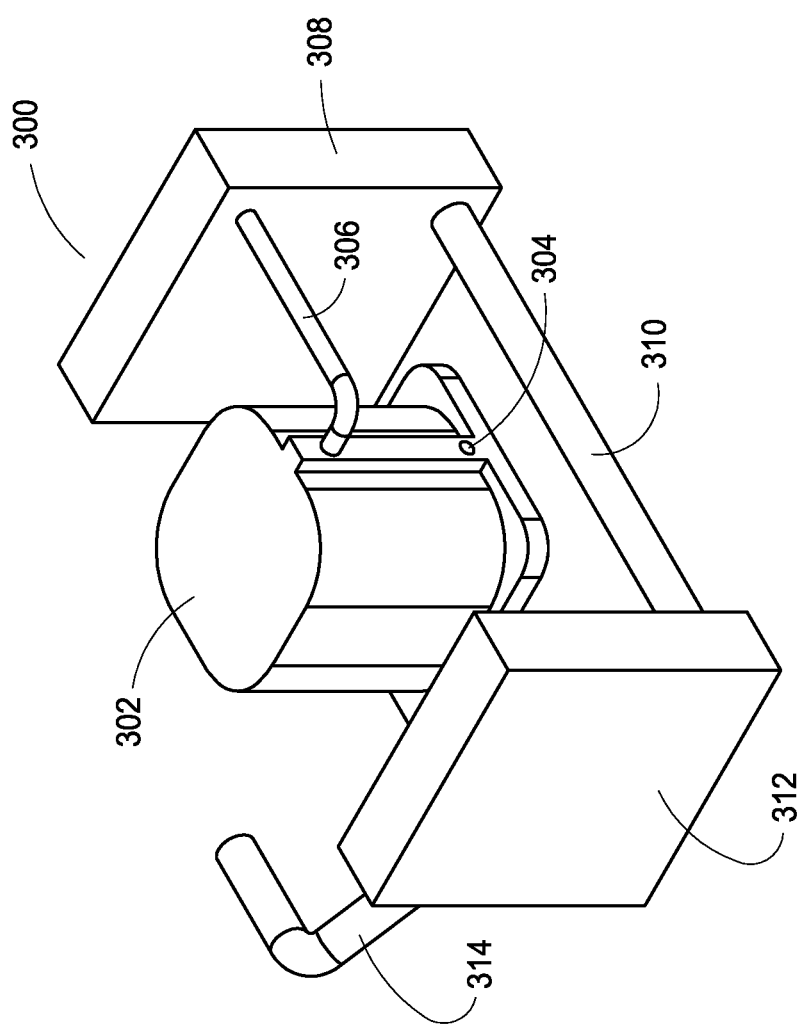
FIG. 20 is a depiction of a component of an analytical instrument according to an embodiment of the disclosure.

As can be seen in FIG. 20, conduit 306 can have a substantially different resistance to flow than conduits 310 and 314. For example, conduit 306 is substantially smaller in internal diameter than conduits 310 and 314 to facilitate the pressure differential and reduced heat transfer to the pot referenced herein.

In accordance with example implementations mass 308 can be maintained at a first temperature, and mass 312 can be maintained at a second temperature different from the first temperature. These masses can represent heat exchangers that transfer heat to cold helium exhaust gas leaving pot 36 as described in the context of FIG. 18 (i.e. "exhaust cooling" of the radiation shields). Accordingly, masses such as these that are thermally associated with the exhaust of the pot do not need to be connected with the liquefier.

Figure 22:
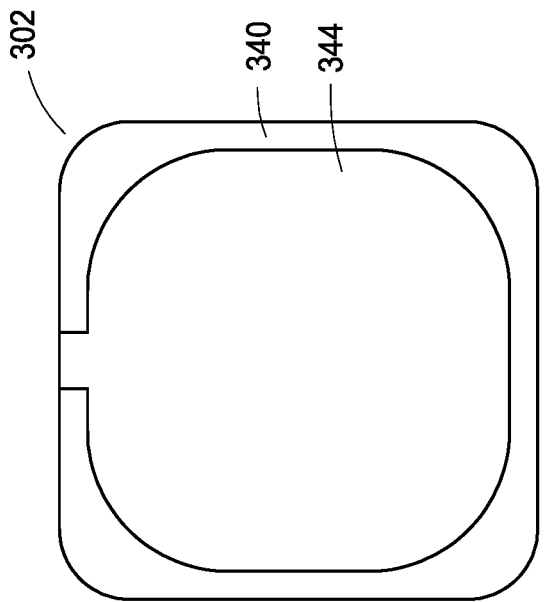
FIG. 22 is a portion of the component of FIG. 20 according to an embodiment of the disclosure.
Figure 23:
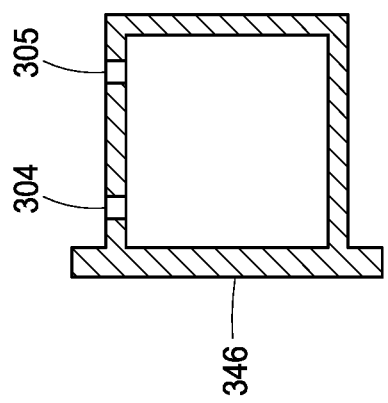
FIG. 23 is a portion of the component of FIG. 20 according to an embodiment of the disclosure.
Figure 21:
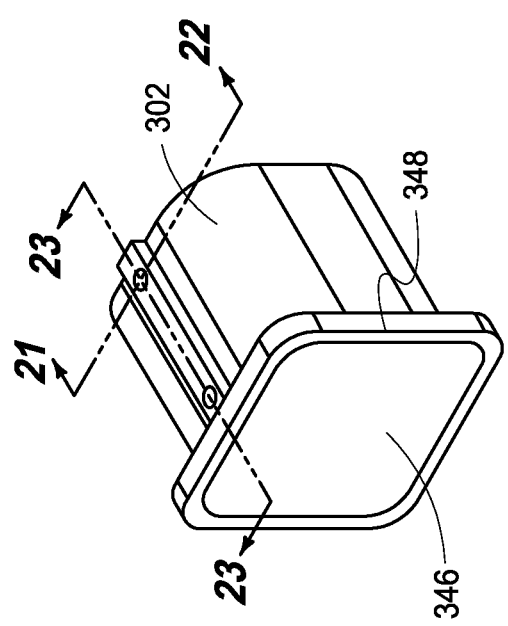
FIG. 21 is a portion of the component of FIG. 20 according to an embodiment of the disclosure.
Figure 26:
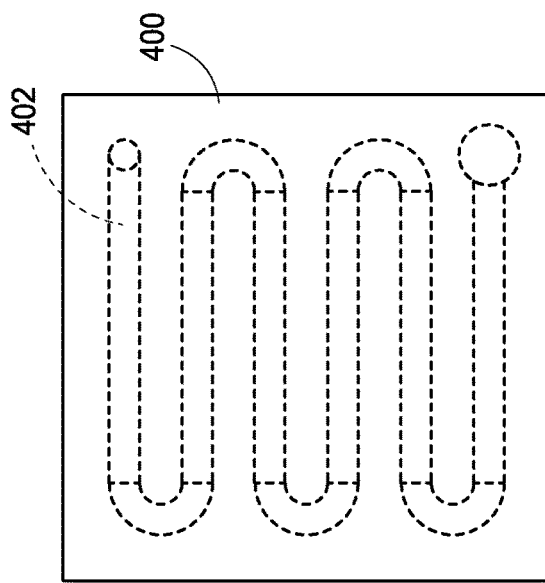
FIG. 26 is a portion of the component of FIG. 20 according to an embodiment of the disclosure.
Figure 25:
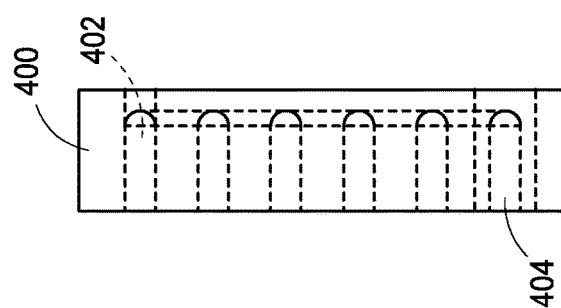
FIG. 25 is a portion of the component of FIG. 20 according to an embodiment of the disclosure.
Figure 24:
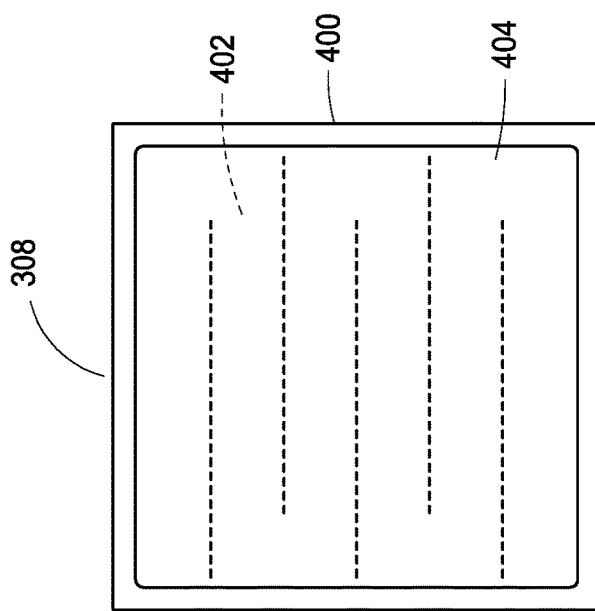
FIG. 24 is a portion of the component of FIG. 20 according to an embodiment of the disclosure.
Figure 27:
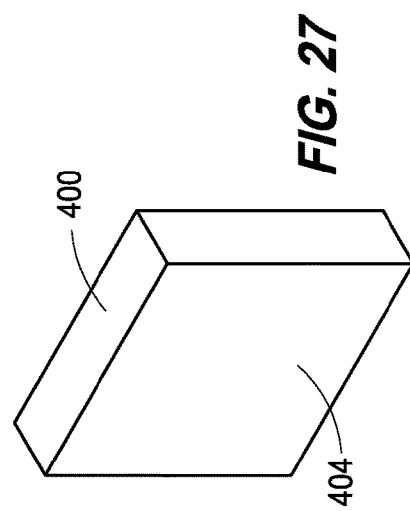
FIG. 27 is a portion of the component of FIG. 20 according to an embodiment of the disclosure.
Figure 30:
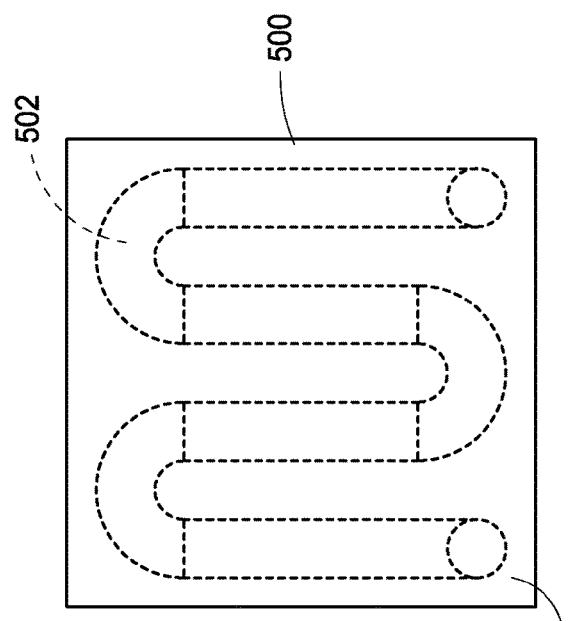
FIG. 30 is a portion of the component of FIG. 20 according to an embodiment of the disclosure.
Figure 29:
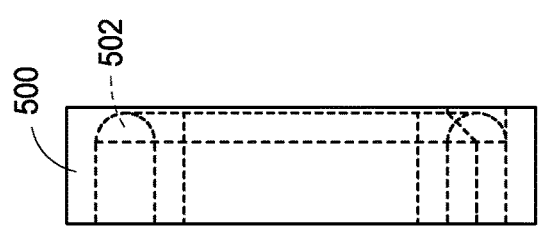
FIG. 29 is a portion of the component of FIG. 20 according to an embodiment of the disclosure.
Figure 28:
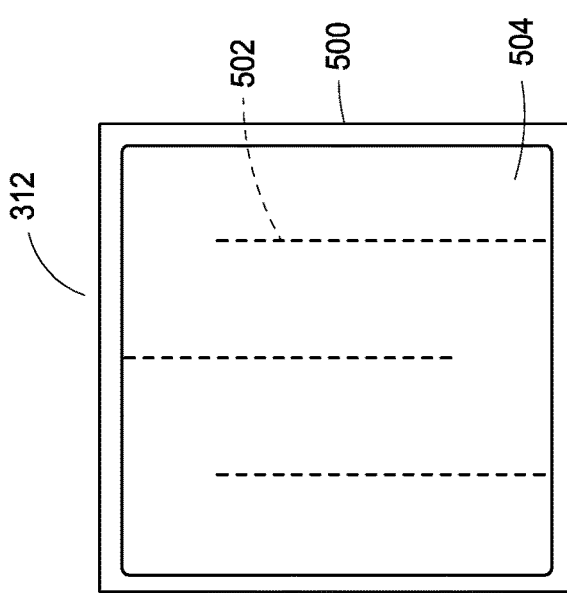
FIG. 28 is a portion of the component of FIG. 20 according to an embodiment of the disclosure.
Figure 31:
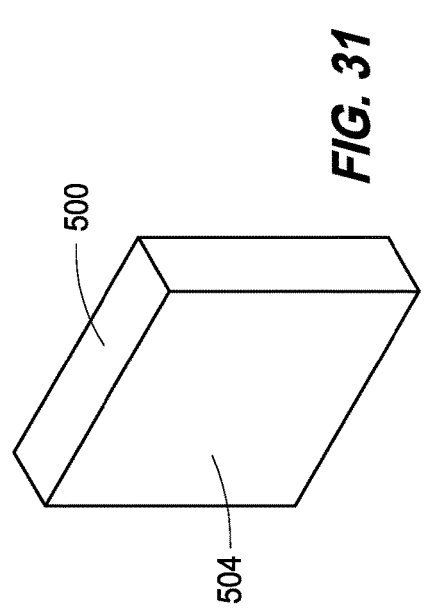
FIG. 31 is a portion of the component of FIG. 20 according to an embodiment of the disclosure.
Figure 32:
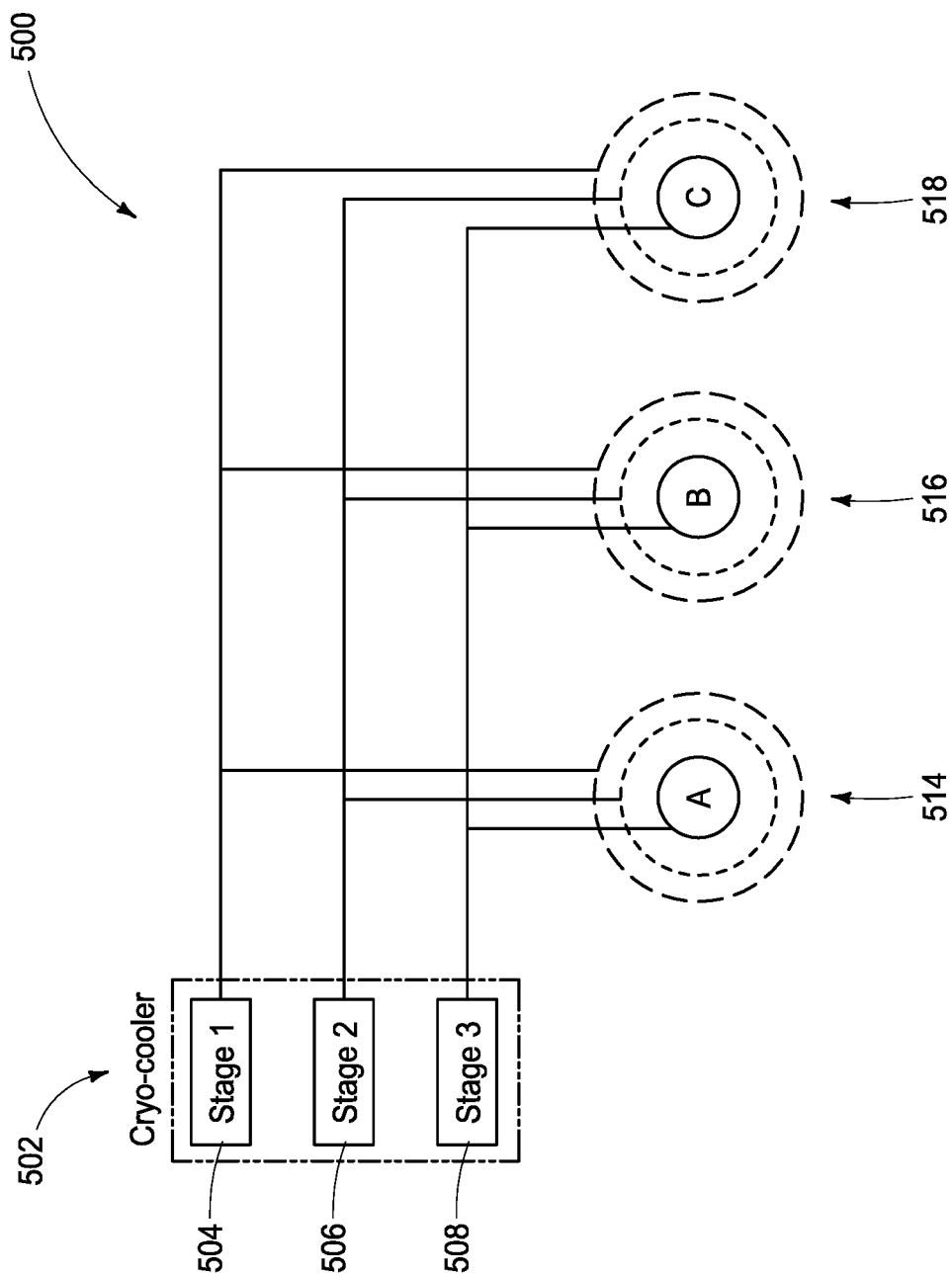
FIG. 32 is an overview of temperature distribution about an instrument according to an embodiment of the disclosure.

Referring next to FIGS. 21-23, a pot design is provided for pot 302. Pot 302 can be considered a variable temperature analytical instrument sample temperature source component. Component 302 can include a housing 340 defining an inner volume 344 in at least one cross section. The intake 304 and exhaust 305 passageways extending through housing 340 and in fluid communication with void 344. Housing 340 can be further defined by a lid 346 in thermal communication with mass 342. Housing 340 can further define a flange 348 forming a planar alignment with lid 346.

Referring next to FIGS. 24-27, mass 308 is shown in more detail. Mass 308 can have a housing 400 and within housing 400 a tortured path of conduit 402 can be defined and sealed within mass 308 with a lid 404 according to example configurations. As shown in at least one embodiment, the tortured path can be serpentine in at least one configuration.

Referring next to FIGS. 28-31, mass 312 is shown in more detail. Mass 312 can have a housing 500 and within housing 500 a tortured path of conduit 502 can be defined and sealed within mass 312 with a lid 504 according to at least one configuration. Accordingly, the tortured paths of mass 308 and 312 define different volumes within the respective members. The present embodiment, depicts at least two masses other than the pot. Additional masses are contemplated. The combination of the multiple masses with the conduit having different resistances to flow can provide a predefined heat exchange efficiency between the pot and the pump of the pod.

Referring next to FIGS. 32-34B, and as mentioned throughout the specification, a depiction of the distributive temperature control of an analytical instrument 500 is provided. Example implementations can include the distribution of temperature from a cold source such as a cold head, cryocooler, and/or a liquefier 502. Cold source 502 can have multiple stages of cooling as described herein. Stages can be predefined, but they can include 100 K, 30 K, and 4 or even 1.5 K. These cold sources can be thermally connected with discrete portions of the instrument. Discrete portions of the instrument refer to portions of the instrument or associated instruments that are thermally separated from one another. For example, the instrument may have an analysis component as shown and described herein that provides a cold source reservoir as a pot in fluid connection with a cryofluid source. The analysis component may have thermally discrete portions itself, such as a sample platform and sample probe. Each of these portions, for example are discrete portions of the analysis component and each can be coupled to cold sources of the instrument. Further, the instrument may be associated with additional components such as a superconducting magnet. In this configuration, discrete portions of the super conducting magnet and the analysis component can be thermally coupled to a stage or stages of the cold source. Accordingly, specifically selected regions or portions are cooled when coupled to the cold source stage(s).

In accordance with another example configuration, a cold head with two distinct temperature stages (4K and 30K) can be utilized as a cold source for the instrument. Stage 1 (at 30K) can be connected to a radiation shield that protects a large superconducting magnet. Stage 2 (4K) can be connected to the superconducting magnet itself to maintain the temperature at 4K. While utilizing these stages of the coldhead, helium gas can be liquefied by the cold head and collected just below the coldhead. This liquid helium can be transferred to a sample analysis component that sits inside a bore of the superconducting magnet. This sample space can have a different pressure from the housing of the superconducting magnet due to the use of a pressure barrier. In this configuration the sample chamber can be warmed by blocking the flow of helium (vapor lock), samples exchanged, and the chamber cooled back down again by restarting the flow of helium. During this sample exchange, the magnet continues to be cooled via the two thermal links to the coldhead, without having to be warmed up.

Accordingly, one cold head can be used with two distinct temperature sources to generate a third temperature source (liquid helium). All three temperature sources can be used to cool three distinct portions of the instrument (the magnet, its radiation shield, and the sample). In accordance with additional embodiments, the exhaust from the sample cooling pot can be used as a cold source to cool the radiation shield of the sample as well, or other portions of the instrument or associated instruments as desired.

As another example, a component 514 can be the analytical component exiting the liquefier. Component 514 can be operatively coupled to stages 504, 506, and 508 as shown. Component 516 can be a pressure or thermal barrier as described herein. Component 516 can reside between components of the instrument, for example, between analysis component 14 and the pod, for example. Accordingly, component 516 can be operatively coupled to stages 504, 506, and 508. Additionally, component 518 can be another pressure or thermal barrier. Accordingly, component 518 can be operatively coupled to stages 504, 506, and 508. In accordance with example configurations, stages 504, 506, or 508 can be used in combination with portions of the heat exchanger components described herein to provide additional or different cold sources to discrete portions of the instrument or instruments associated with the instrument.

Figure 33:
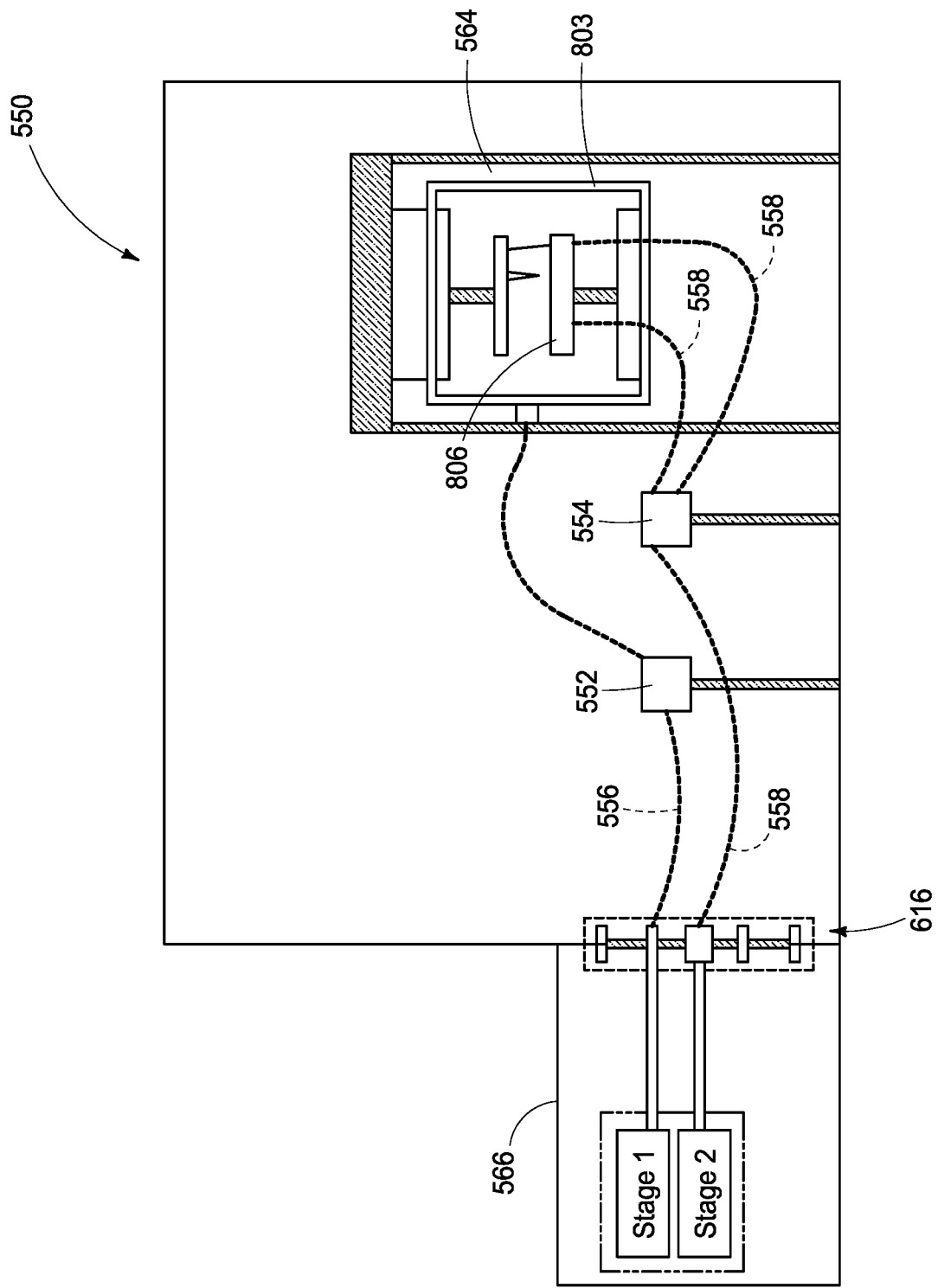
FIG. 33 is another view of temperature distribution about an instrument according to an embodiment of the disclosure.

Referring next to FIG. 33, a more detailed depiction of the distributive cooling provided herein is given with reference to instrument 550. Instrument 550 can include a liquefier 566 having at least two stages with each stage providing a different cold source temperature. Between liquefier 566 and analysis component 564 can be a thermal or pressure barrier 616. Thermal coupling 556 and 558 can be provided between barrier 616 and thermal shield 803 and sample analysis platform or stage 806. Accordingly, stage 1 temperature is provided to shield 803 and stage 2 temperature is provided to platform 806. Further, junctions 552 and 554 may be provided to allow for the additional distribution of temperatures within a component as shown.

Figure 34A:
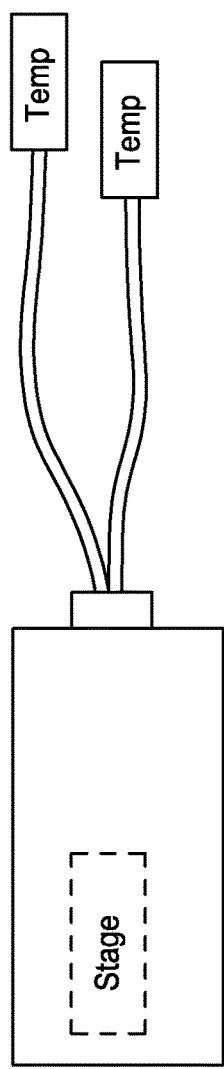
FIG. 34A is a depiction of a variable temperature analytical instrument according to an embodiment of the disclosure.

Also with reference to FIG. 34A, a single cold source can be used as a cold source for multiple discrete portions. For example, a cold head stage or heat exchanger mass can be used to provide a cold source for multiple discrete masses.

Figure 34B:
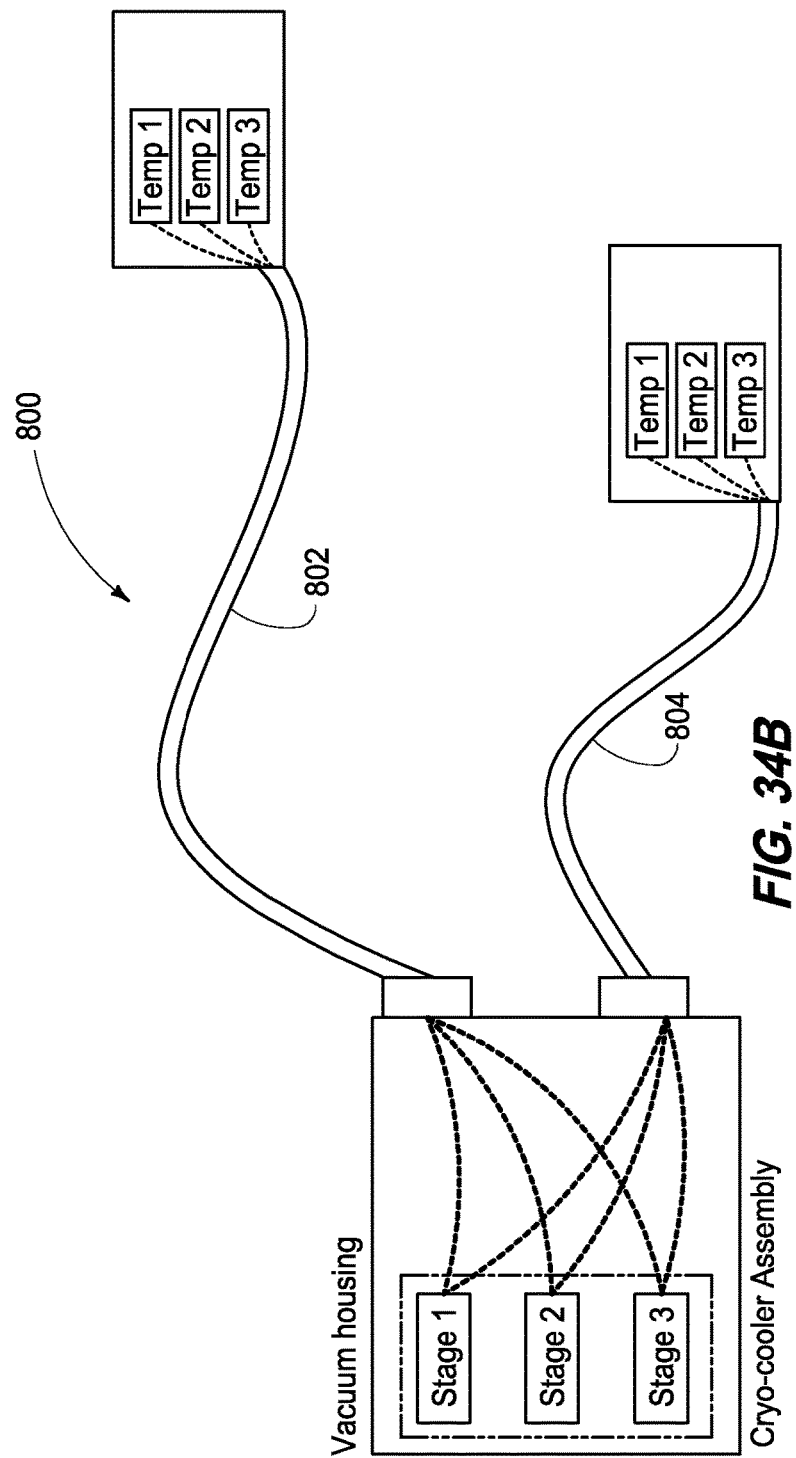
FIG. 34B is another depiction of a variable temperature analytical instrument according to an embodiment of the disclosure.

In accordance with other example implementations and reference to FIG. 34B, multiple cold sources having the same or different temperatures can be provided via single conduits 802 and 804 to provide a plurality of cold source temperatures to discrete portions of components of the instrument or instruments associated with the instrument. Accordingly, thermal connection between different stages can be provided via bundled conduits. For example, conduit 802 can provide multiple different cold source temperatures as can bundled conduit 804.

The specification has referred to heat and cold sources. While admittedly not the exact thermodynamic term, the terms were chosen to allow persons with less than ordinary skill in the thermodynamic arts to understand quickly and clearly what temperatures are being discussed. While not inconsistent with common thermodynamics, a heat source is considered any source that provided heat to another mass or item. A cold source is considered any source that has less heat than a mass or item associated therewith. Therefore, a cold source will absorb heat from another mass or item rendering the mass or item cooler for being thermally coupled to the cold source.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect.

The invention claimed is:

1. A variable temperature analytical instrument comprising:
   at least one heat or cold source configured to generate a temperature; and
   an analysis component operatively coupled to the at least one heat or cold source, the analysis component comprising discrete instrument portions individually thermally coupled to the at least one heat or cold source.

2. The variable temperature analytical instrument of claim 1 wherein the cold source comprises a multiple stage temperature source.

3. The variable temperature analytical instrument of claim 2 wherein one of the multiple stages provides a first temperature and another of the multiple stages provides a second temperature.

4. The variable temperature analytical instrument of claim 3 wherein the first temperature is greater than the second temperature.

5. The variable temperature analytical instrument of claim 3 wherein the one stage is thermally connected with one discrete portion of the analysis component and the other stage is thermally connected with another discrete portion of the analysis component.

6. The variable temperature analytical instrument of claim 5 wherein the one discrete portion of the analysis component is a first mass thermally insulated and about a thermal conduit to the analysis component.

7. The variable temperature analytical instrument of claim 5 wherein the other discrete portion of the analysis component is a second mass in thermal connection with a thermal conduit of the analysis component.

8. The variable temperature analytical instrument of claim 3 wherein the cold source is configured to provide a fluid via a conduit to the analysis component, and wherein the one stage is thermally coupled with one discrete portion of the conduit and the other stage is coupled with another discrete portion of the conduit.

9. The variable temperature analytical instrument of claim 1 wherein the source is configured to provide a condensed fluid as a cold temperature source.

10. The variable temperature analytical instrument of claim 9 wherein the temperature source comprises a multiple stage temperature source with all stages being maintained below 300 K.

11. The variable temperature analytical instrument of claim 1 wherein the discrete portions are thermally separated from one another.

12. A method for maintaining temperatures within a variable temperature analytical instrument, the method comprising providing a plurality of thermal coupling between a plurality of discrete heat or cold sources to a plurality of discrete portions of an analysis component of the instrument.

13. The method of claim 12 wherein the discrete portions of the analysis component comprise discrete portions of a pressure barrier.

14. The method of claim 12 wherein the analytical instrument comprises a multiple stage temperature source and the method comprises providing thermal coupling from at least two of the stages to at least two different discrete portions of the instrument.

15. The method of claim 14 further comprising providing thermal coupling from one of the two stages of the temperature source to one discrete portion of a fluid conduit of the instrument.

16. The method of claim 15 further comprising maintaining the one stage at one temperature and the one discrete portion is a first mass associated with the fluid conduit.

17. The method of claim 15 further comprising maintaining the one stage at one temperature and the one discrete portion is a first mass associated with a sample analysis component of the instrument.

18. The method of claim 15 further comprising providing thermal coupling from another of the two stages of the temperature source to another discrete portion of a fluid conduit of the instrument.

19. The method of claim 18 further comprising maintaining the other stage at another temperature and the other discrete portion is a second mass associated with the fluid conduit.

20. The method of claim 19 further comprising maintaining the other stage at another temperature and the other discrete portion is a second mass associated with a sample analysis component of the instrument.

21. The method of claim 14 wherein one of the two discrete portions of the instrument is a first mass thermally coupled to a conduit between the temperature source and a sample analysis component, and another of the two discrete portions of the instrument is a second mass thermally coupled to the conduit.

22. The method of claim 21 further comprising maintaining the one stage at a temperature greater than a temperature of the other stage.

23. The method of claim 22 further comprising aligning the first mass between the other stage and the second mass.

* * * * *

UNITED STATES PATENT AND TRADEMARK OFFICE
CERTIFICATE OF CORRECTION

| | |
|---|---|
| PATENT NO. | : 11,125,664 B2 |
| APPLICATION NO. | : 16/209220 |
| DATED | : September 21, 2021 |
| INVENTOR(S) | : Josh Doherty et al. |

It is certified that error appears in the above-identified patent and that said Letters Patent is hereby corrected as shown below:

In the Specification

Column 2, Line 15 – Replace "to embodi-" with --to an embodi- --

Column 2, Line 31 – Replace "to embodiment" with --to an embodiment--

Column 2, Line 37 – Replace "disclosure" with --disclosure.--

Column 2, Line 38 – Replace "is depiction" with --is a depiction--

Column 3, Line 43 – Replace "cold source" with --a cold source--

Column 8, Line 48 – Replace "at difference" with --at different--

Column 10, Line 8 – Replace "to extent" with --to extend--

Column 10, Line 18 – Replace "also can also" with --can also--

Signed and Sealed this
Fifth Day of July, 2022

Katherine Kelly Vidal
*Director of the United States Patent and Trademark Office*